United States Patent
Senoo et al.

(10) Patent No.: US 6,741,004 B2
(45) Date of Patent: May 25, 2004

(54) CREASED ARMATURE WINDING INSULATOR FOR DYNAMO-ELECTRIC MACHINE

(75) Inventors: Akira Senoo, Tokyo (JP); Naohiro Oketani, Tokyo (JP); Takusi Takizawa, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 184 days.

(21) Appl. No.: 09/780,480

(22) Filed: Feb. 12, 2001

(65) Prior Publication Data

US 2002/0014806 A1 Feb. 7, 2002

(30) Foreign Application Priority Data

Aug. 2, 2000 (JP) ......................... 2000-234159

(51) Int. Cl.$^7$ ........................... H02K 3/34; H02K 1/00; H02K 17/00; H02K 19/00; H02K 21/00
(52) U.S. Cl. ................. 310/215; 310/216; 310/203; 310/195; 310/179; 310/49 R
(58) Field of Search ................. 310/215, 216, 310/195, 203, 179, 49 R, 10

(56) References Cited

U.S. PATENT DOCUMENTS

| | | | |
|---|---|---|---|
| 2,417,746 A | | 3/1947 | Fletcher ....................... 310/215 |
| 2,701,316 A | | 2/1955 | Willits et al. ................. 310/214 |
| 3,130,335 A | | 4/1964 | Rejda ........................... 310/215 |
| 4,147,946 A | * | 4/1979 | Linscott et al. .............. 310/214 |
| 4,433,262 A | * | 2/1984 | Greenlee ...................... 310/214 |
| 4,757,601 A | * | 7/1988 | Leech et al. ................... 29/597 |
| 4,829,206 A | * | 5/1989 | Honshima et al. ........... 310/214 |
| 5,508,577 A | * | 4/1996 | Shiga et al. .................. 310/201 |
| 5,739,617 A | * | 4/1998 | Katoh et al. .................. 310/214 |
| 5,745,977 A | * | 5/1998 | Ichikawa et al. .............. 29/598 |
| 5,864,193 A | * | 1/1999 | Katoh ........................... 310/214 |
| 5,973,432 A | * | 10/1999 | Katagiri et al. ............... 310/214 |
| 6,154,950 A | * | 12/2000 | Katahira et al. ............... 29/598 |
| 6,389,679 B1 | * | 5/2002 | Kliman et al. ................. 29/596 |
| 6,404,089 B1 | * | 6/2002 | Tomion ........................ 310/162 |
| 6,448,685 B1 | * | 9/2002 | Mayer et al. ................. 310/254 |
| 6,448,686 B1 | * | 9/2002 | Dawson et al. .............. 310/254 |
| 6,472,792 B1 | * | 10/2002 | Jack et al. .................... 310/254 |
| 6,492,757 B2 | * | 12/2002 | Nakamura et al. ........... 310/180 |
| 6,510,603 B1 | * | 1/2003 | Ebihara et al. ................ 29/598 |
| 6,580,193 B2 | * | 6/2003 | Yoshikawa et al. .......... 310/215 |

FOREIGN PATENT DOCUMENTS

| | | | | |
|---|---|---|---|---|
| GB | 93L694 A | | 7/1963 | |
| JP | 48-9201 | | 2/1973 | |
| JP | 57135646 A | | 8/1982 | |
| JP | 61154439 A | * | 7/1986 | ............ H02K/3/04 |
| JP | 61-189153 A | | 8/1986 | |
| JP | 63136941 A | * | 6/1988 | .......... H02K/15/12 |
| JP | 11187601 A | * | 7/1999 | .......... H02K/3/487 |

* cited by examiner

*Primary Examiner*—Dang Le
*Assistant Examiner*—Pedro J. Cuevas
(74) *Attorney, Agent, or Firm*—Sughrue Mion, PLLC

(57) ABSTRACT

A method includes the steps of forming a substantially U-shaped insulator having outwardly bent portions formed by bending the side portions thereof at bent parts so as to be apart from each other, forming winding assemblies including strands of wire wound in a predetermined wound state, mounting the insulator in each slot in a manner such that the outwardly bent portions of the insulator protrude from an opening of the slot, and inserting the winding assemblies in each insulator from an open side of the slot by being guided by the outwardly bent portions and pushing the winding assemblies together with the insulator into each slot.

7 Claims, 19 Drawing Sheets

CREASED ARMATURE WINDING INSULATOR FOR DYNAMO-ELECTRIC MACHINE

BACKGROUND OF THE INVENTION

1. Field of the Invention

The present invention relates to dynamo-electric machines for apparatuses such as alternators driven by, for example, internal combustion engines. In particular, the present invention relates to an armature for an automotive alternator to be mounted on an automotive vehicle, such as an automobile or a truck.

The entire content of the basic Japanese Patent Application from which the priority under the Convention is claimed in this application is hereby incorporated by reference into this application.

2. Description of the Related Art

FIG. 27 is a perspective view of a stator for a known automotive alternator.

In FIG. 27, a known stator 1 includes a stator core 2 provided with a plurality of slots 2a extending in the axial direction and disposed alongside each other in the circumferential direction at a predetermined pitch, a stator winding 3 mounted on the stator core 2, and substantially U-shaped insulators 4 disposed in the slots 2a for electrically insulating between the stator core 2 and the stator winding 3. Thirty-six slots 2a are formed in the stator core 2 for receiving the stator winding 3 configured with a three-phase alternating winding.

With reference to FIGS. 28 to 34, a method for manufacturing the known stator 1 is described below.

A belt-shaped member having projections and recesses is made of a belt-like magnetic SPCC thin plate. A given number of the belt-shaped members are laminated and are welded to each other by a laser at the peripheries thereof, thereby forming a rectangular parallelepiped laminated-core 5 shown in FIG. 28. Thirty-six slots 5a are formed at one face of the laminated core 5.

A winding assembly 7A is formed in a plane shape with one strand of wire 6, made of a copper wire having a circular section and coated with an insulating film, wound in a predetermined number of waves at a three-slot pitch. The winding-starting end and the winding-finishing end of the strand of wire 6 forming the winding assembly 7A serve as a lead wire 6a and a neutral-point lead wire 6b, respectively. Winding assemblies 7B and 7C are formed with other two strands of wire 6, respectively, wound in the same manner.

In FIG. 29, a substantially U-shaped insulator 4 is inserted in each slot 5a of the laminated core 5 from the open side of the slot 5a, whereby the insulator 4 is received completely in the slot 5a. The three winding assemblies 7A, 7B, and 7C overlap each other by being offset by a one-slot pitch from each other, as shown in FIG. 30. In FIG. 31, the overlapping winding assemblies 7A, 7B, and 7C are inserted in every third slots 5a, respectively, from the open sides of the slots 5a. As shown in FIGS. 32 and 33, the winding assemblies 7A, 7B, and 7C are thus mounted on the laminated core 5.

In FIG. 34, the laminated core 5 mounted with the winding assemblies 7A, 7B, and 7C is rolled up and is formed in a cylinder by a forming device (not shown), and butt-welded by a laser at the longitudinal ends thereof, whereby the stator 1 shown in FIG. 27 is obtained.

The neutral-point lead wires 6b of the strand of wires 6 forming the winding assemblies 7A, 7B, and 7C are connected to each other, thereby forming a three-phase alternating winding constituting the stator winding 3 included in the known stator 1. The winding assemblies 7A, 7B, and 7C have a phase difference of 120 degrees from each other, which are windings for phase-a, phase-b, and phase-c, respectively, of the three-phase alternating winding. When the stator 1 is mounted in an automotive alternator, the lead wires 6a of the strands of wire 6 forming the winding assemblies 7A, 7B, and 7C are connected to a rectifier.

In a method for manufacturing the known stator, the substantially U-shaped insulators 4 are inserted in the slots 5a of the rectangular parallelepiped laminated core 5, then the winding assemblies 7A, 7B, and 7C are inserted in the slots 5a from the open sides thereof. Since the gap between the stator 1 and a rotor (not shown) of an automotive alternator is very small, even a small protrusion of the insulator 4 from the slot 5a may interfere with the rotor. Therefore, the insulators 4 are formed so as not to protrude from the slots in the radial directions.

Therefore, there is a problem that the mounting operation of the winding assemblies is not easy to perform because the ends of the insulators 4 are disposed substantially on the same level as that of the ends of teeth 5b, whereby the ends of the insulators 4 do not function as guides when the winding assemblies 7A, 7B, and 7C are inserted in the slots 5a.

Two sides of each U-shaped insulator 4, opposing to each other, are formed in parallel to each other, and the open sides of the slots 5a are not closed when the winding assemblies 7A, 7B, and 7C have been received in the slots 5a. Therefore, during the operation of rolling the laminated core 5, the strand of wires 6 are likely to fall away from the slots 5a, whereby the operation cannot be performed efficiently.

The ends of the insulators 4 are drawn toward the bottoms of the slots 5a during the insertion of the winding assemblies 7A, 7B, and 7C due to the friction between the winding assemblies 7A, 7B, and 7C and the insulators 4, whereby flanges 5c of the teeth 5b are exposed at ends thereof in the peripheral direction of the laminated core 5. Therefore, there is a problem in that the strands of wire 6 of the winding assemblies 7A, 7B, and 7C are scratched by the peripheral ends of the flanges 5c, thereby causing damages to the insulating films of the strand of wires 6, whereby the insulation is deteriorated. Moreover, the insulators 4 between the inner walls of the slots 5a and the strands of wire 6 are removed from some portions in the slots 5a after inserting the winding assemblies 7A, 7B and 7C in the core, whereby the insulation is deteriorated.

SUMMARY OF THE INVENTION

Accordingly, it is an object of the present invention to provide a method for manufacturing an armature for a dynamo-electric machine and an armature manufactured by the method, in which a substantially U-shaped insulator having top sides thereof bent so as to be apart from each other is mounted in each slot in a manner such that the top sides of the insulator protrude from the slot, and a winding assembly is inserted in the slots from open sides thereof. The winding assembly can be easily inserted due to the top sides of the insulator serving as guides. Due to the top sides of the insulator, which are bent so as to be apart from each other, strands of wire forming the winding assembly inserted in the slots are prevented from falling away from the slots by the top sides deformed so as to enclose an opening of each slot, and the insulator is prevented from being removed the top edges thereof toward the bottom of the slot, thereby improving the insulation.

To these ends, according to an aspect of the present invention, a method is provided for manufacturing an armature for a dynamo-electric machine, the armature comprising an armature core provided with a plurality of slots extending in an axial direction and disposed alongside each other in a circumferential direction, an armature winding inserted in the slots so as to be mounted on the armature core, and an insulator mounted in each of the slots for insulating between the armature core and the armature winding. The method comprises the steps of forming a substantially U-shaped insulator having side portions connected with a bottom portion, the side portions being bent at a first bent part of each side portion so as to be apart from each other to form outwardly bent portions on the top sides of the side portions; forming a winding assembly composed of strands of wire formed in a predetermined wound state; mounting the insulator in each of the plurality of slots in a manner such that the outwardly bent portions of the insulator protrude from an open side of the slot; and inserting the winding assembly in the insulator from the open side of each slot by being guided by the outwardly bent portions of the insulator, and pushing the winding assembly together with the insulators into the slots.

In the method for manufacturing an armature for a dynamo-electric machine, the step of forming the substantially U-shaped insulator may include the step of bending the outwardly bent portions at a second bent part so as to be close to each other, whereby each of the outwardly bent portions is formed in an L-shape.

The first and second bent parts of one of the side portions of the insulator may be positioned shifted toward the bottom portion of the insulator with respect to the first and second bent parts of the other side portion of the insulator.

At least one part of the bottom portion of the insulator may be formed in one of concave and convex shapes.

The method may further comprising the steps of preparing a rectangular parallelepiped laminated-core provided with the plurality of slots, and rolling the rectangular parallelepiped laminated-core provided with the insulator mounted in each of the plurality of slots and the winding assembly inserted in the insulators mounted in the plurality of slots and butt-welding the laminated core at ends thereof so as to form a cylinder.

The winding assembly may be formed so that the strands of wire are disposed alongside each other in the slot-depth direction in each slot.

The winding assembly may comprise a pair of first and second winding groups, the first winding group comprising a number of first winding sub-portions each formed with the strand of wire made of a continuous conductor, the strand of wire being formed in a first wave shape by connecting straight portions which being disposed at a pitch of a predetermined number of slots and being alternately offset from each other by a predetermined distance in a direction perpendicular to the direction of the disposition thereof with turn portions, the first winding sub-portions being disposed at a pitch of one slot from each other and being equal in number to the predetermined number of slots, and the second winding group comprising a number of second winding sub-portions each formed with the strand of wire made of a continuous conductor, the strand of wire being formed in a second wave shape opposite to the first wave shape by connecting straight portions which being disposed at a pitch of the predetermined number of slots and being alternately offset from each other by the predetermined distance in a direction perpendicular to the direction of the disposition thereof with turn portions, the second winding sub-portions being disposed at a pitch of one slot from each other and being equal in number to the predetermined number of slots.

A plurality of the winding assemblies overlapping each other may be inserted in the plurality of slots.

The steps of mounting the insulator in each of the plurality of slots and inserting the winding assembly in the insulators mounted in the plurality of slots may be alternately and repeatedly performed.

According to another aspect of the present invention, an armature for a dynamo-electric machine comprises an armature core provided with a plurality of slots extending in an axial direction and disposed alongside each other in a circumferential direction; an armature winding inserted in the slots so as to be mounted on the armature core; and an insulator mounted in each of the slots for insulating between the armature core and the armature winding. The insulator is disposed between an inner face of each slot and the armature winding. First creases are formed on side portions of each insulator so as to extend in a longitudinal direction of the slot at a slot-opening side of the side portions, the first creases being formed by first bent parts for bending the slot-opening side of the side portions so as to be apart from each other.

Second creases may be formed on the side portions of each insulator so as to extend in a longitudinal direction of the slot at a slot-opening side of the first creases, the second creases being formed by second bent parts for bending the slot-opening side of the side portions so as to be close to each other.

The first crease and the second crease of a first side portion of each insulator may be formed shifted toward the bottom of the slot with respect to the first crease and the second crease, respectively, of a second side portion of each insulator, whereby the top sides of the first and second side portions of each insulator, one overlapping the other, enclose an opening of each slot in a manner such that the top side of the second side portion is positioned over the top side of the first side portion.

The side portions of each insulator may expand in a circumferential direction at the bottom sides of the side portions of the insulator, thereby coming into close contact with inner faces of the slot toward the bottom thereof.

The armature winding may be constituted by at least one winding assembly into which a pair of first and second winding groups is assembled before insertion in the slots, the first winding group comprising a number of first winding sub-portions each having one turn constructed by winding a stand of wire made of a continuous conductor so as to alternately occupy an inner layer and an outer layer in a slot depth direction within the slots at intervals of a predetermined number of slots, the first winding sub-portions being disposed at a pitch of one slot from each other and being equal in number of the predetermined number of slots, and the second winding group comprising a number of second winding sub-portions each having one turn constructed by winding a stand of wire made of a continuous conductor so as to alternately occupy an inner layer and an outer layer in a slot depth direction within the slots at intervals of the predetermined number of slots and so as to be inversely wound and offset by an electrical angle of 180 degrees relative to the first winding sub-portions, the second winding sub-portions being disposed at a pitch of one slot from each other and being equal in number of the predetermined number of slots.

The armature winding may comprise a plurality of the winding assemblies, and one insulator may be received in each slot for insulating the plurality of the winding assemblies from an inner face of each slot.

The armature winding may comprise a plurality of the winding assemblies, and a plurality of insulators may be received in each slot for individually insulating the plurality of the winding assemblies from an inner face of each slot.

DESCRIPTION OF THE PREFERRED EMBODIMENTS

Embodiments according to the present invention are described below with reference to the drawings.

First Embodiment

Figure 1:
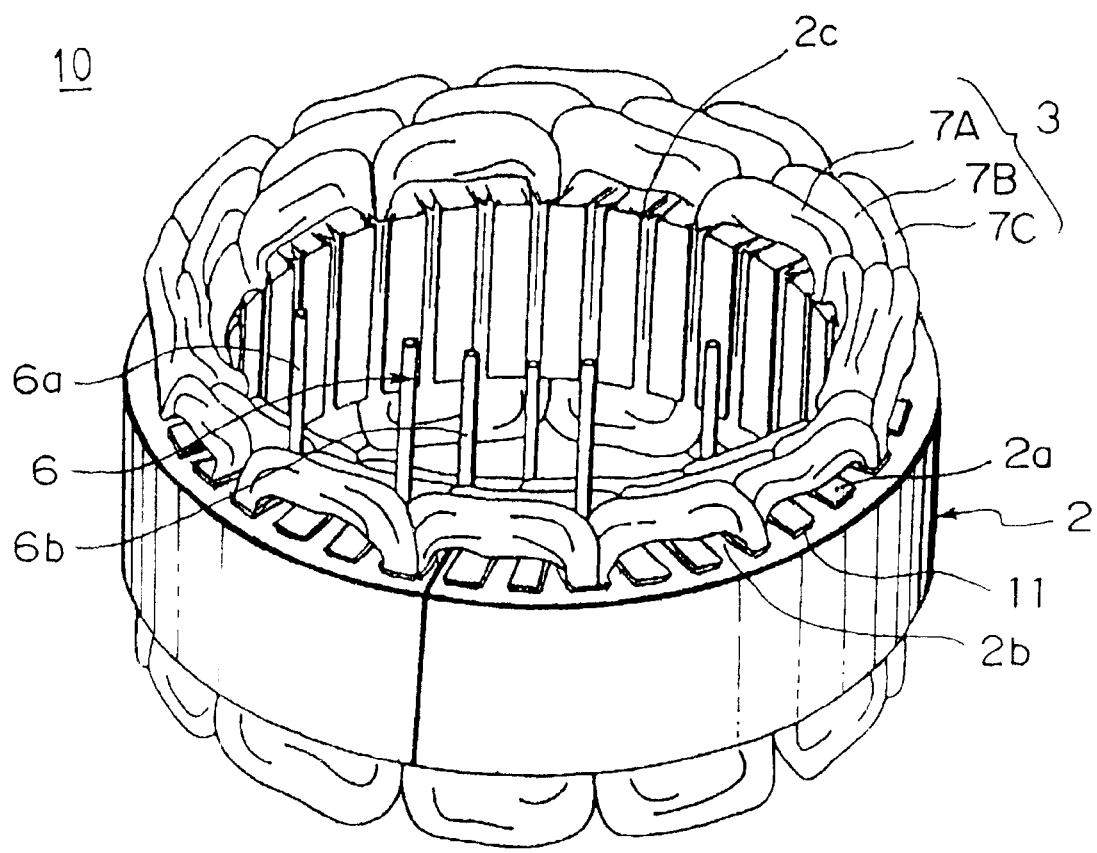
FIG. 1 is a perspective view of a stator for an automotive alternator according to a first embodiment of the present invention.
Figure 2:
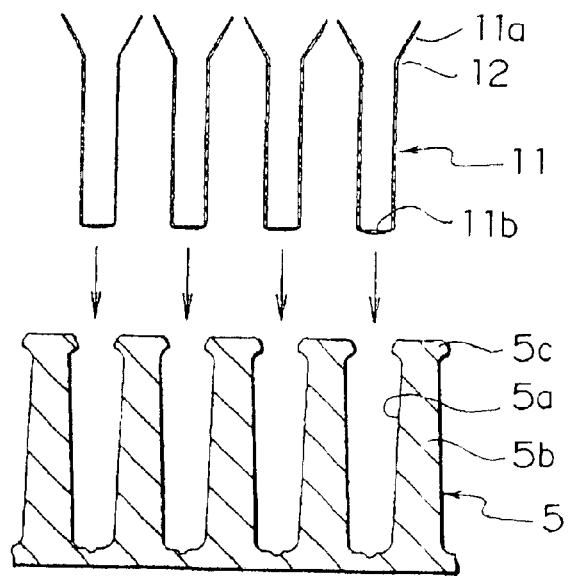
FIG. 2 is a sectional view of the stator for an automotive alternator according to the first embodiment of the present invention, showing an insulator-insertion process in manufacturing of the stator.
Figure 3:
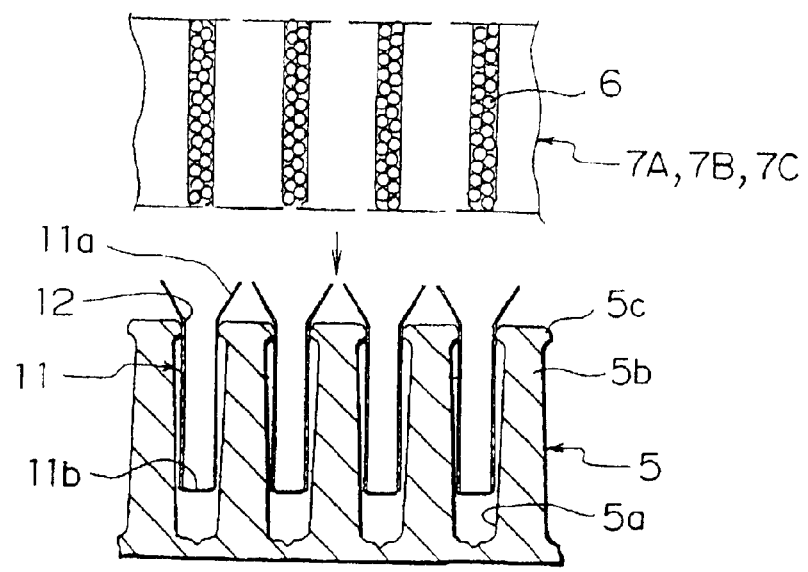
FIG. 3 is a sectional view of the stator for an automotive alternator according to the first embodiment of the present invention, showing a winding-insertion process in manufacturing of the stator.
Figure 4:
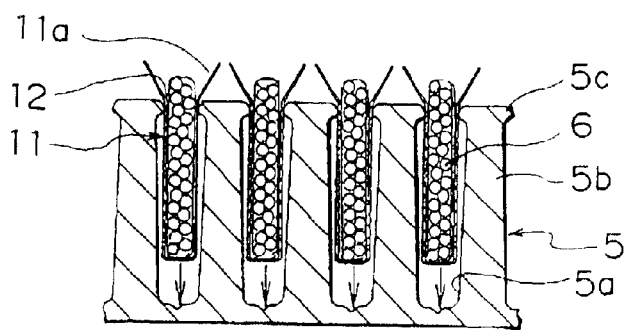
FIG. 4 is a sectional view of the stator for an automotive alternator according to the first embodiment of the present invention, showing windings being inserted in the winding-insertion process in manufacturing of the stator.
Figure 5:
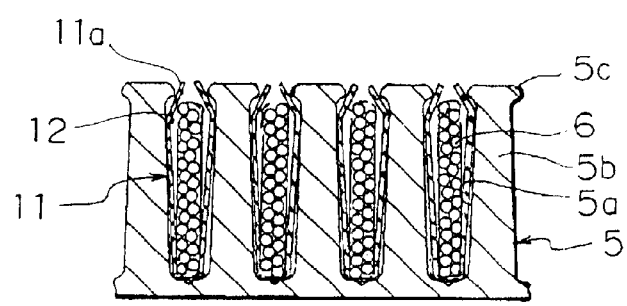
FIG. 5 is a sectional view of the stator for an automotive alternator according to the first embodiment of the present invention, showing the windings having been inserted in manufacturing of the stator.
Figure 6:
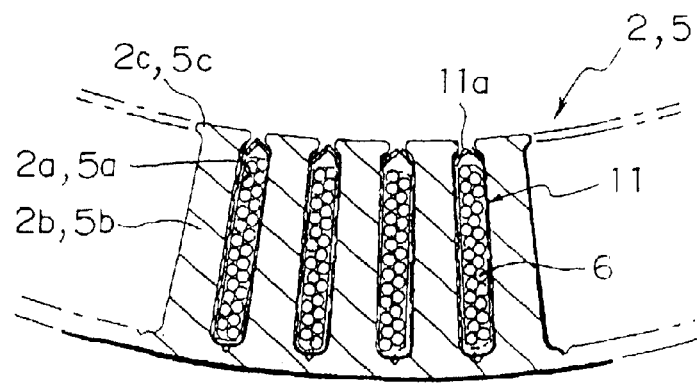
FIG. 6 is a sectional view of the stator for an automotive alternator according to the first embodiment of the present invention, showing a process in which a laminated core is rolled up during manufacturing of the stator.

FIG. 1 is a perspective view of a stator for an automotive alternator according to a first embodiment of the present invention. FIG. 2 is a sectional view of the stator for an automotive alternator according to the first embodiment of the present invention, showing an insulator-insertion process in manufacturing of the stator. FIG. 3 is a sectional view of the stator for an automotive alternator according to the first embodiment of the present invention, showing a winding-insertion process in manufacturing of the stator. FIG. 4 is a sectional view of the stator for an automotive alternator according to the first embodiment of the present invention, showing windings being inserted in the winding-insertion process in manufacturing of the stator. FIG. 5 is a sectional view of the stator for an automotive alternator according to the first embodiment of the present invention, showing the windings having been inserted in manufacturing of the stator. FIG. 6 is a sectional view of the stator for an automotive alternator according to the first embodiment of the present invention, showing a process in which a laminated core is rolled up in manufacturing of the stator.

The same components or components having the same functions as the components or the functions of the components shown in FIGS. 27 to 34 are referred to by using the same reference numerals, and descriptions thereof are omitted.

In FIG. 1, a stator 10 as an armature includes a cylindrical stator core 2 as an armature core provided with a plurality of slots 2a extending in the axial direction and disposed alongside each other in the circumferential direction, a stator winding 3 as an armature winding mounted on the stator core 2, and insulators 11 disposed in each slot 2a for insulating the stator core 2 from the stator winding 3. Each insulator 11 is formed in a substantially U-shape having side portions connected with a bottom portion. The side portions are bent at first bent parts 12 so as to be apart from each other to form outwardly bent portions on the top sides of the side portions. When each substantially U-shaped insulator 11 is inserted in the slot 2a along the inner walls thereof, the outwardly bent portions thereof is deformed by flanges 2c formed on the edges of teeth 2b so as to be close to each other. First creases formed by the first bent parts 12 of each insulator 11 extend in the longitudinal direction of each slot 2a at the open sides of the side portions thereof The stator core 2 is provided with thirty-six slots 2a for receiving the stator winding 3 constructed with one three-phase alternating winding.

A method for manufacturing the stator 10 according to the first embodiment is described with reference to FIGS. 2 to 6.

A belt-shaped member having projections and recesses is made of a belt-shaped thin plate which is made of a magnetic SPCC material. A given number of the belt-shaped members are laminated and are welded by a laser at the peripheries thereof, thereby forming a rectangular parallelepiped laminated core 5. Thirty-six slots 5a are formed at one face of the laminated core 5. A winding assembly 7A is formed with one strand of wire 6, made of a copper wire having a circular section and coated with an insulating film, wound in a predetermined number of waves at a three-slot pitch, the winding assembly 7A being formed in a flat shape on the whole. Each winding assembly 7B or 7C is also formed with one strand of wire 6 wound in a wave-shape in the same manner as the assembly 7A.

In FIG. 2, the insulators 11 are inserted in the slots 5a of the laminated core 5 from the open sides of the slots 5a so that outwardly bent portions 11a of each insulator 11 catch in the flanges 5c of the teeth 5b at the root portions of the outwardly bent portions 11a near the first bent parts 12. The insulators 11 are received in the slots 5a in a manner such that the outwardly bent portions 11a of each insulator 11 protrude from the slots 5a. Then, the winding assemblies 7A, 7B, and 7C overlapping each other and being offset from each other at a one-slot pitch are inserted in every third slots 5a from the open sides of the slots 5a, as shown in FIG. 3. The winding assemblies 7A, 7B, and 7C are inserted in the insulators 11 disposed in the slots 5a by being guided by the outwardly bent portions 11a of the insulators 11. When the winding assemblies 7A, 7B, and 7C reach bottom portions 11b of the insulators 11, the insulators 11 are pushed further toward the inside of the slots 5a by the winding assemblies 7A, 7B, and 7C, as shown in FIG. 4, and are brought into contact with the bottoms of the slots 5a. Thus, the winding assemblies 7A, 7B, and 7C are mounted on the laminated core 5, in which the insulators 11 are deformed by the flanges 5c of the teeth 5b so that the outwardly bent portions 11a of each insulator 11 bent so as to be apart from each other move so as to be close to each other, thereby enclosing the open sides of the slots 5a, as shown in FIG. 5.

In FIG. 6, the laminated core 5 mounted with the winding assemblies 7A, 7B, and 7C thereon is rolled up in a cylinder by a forming device (not shown), and is butt-welded at ends thereof by a laser, whereby the stator 10 shown in FIG. 1 is obtained.

According to the first embodiment, the substantially U-shaped insulators 11, the top sides of each insulator 11 being bent at the first bent parts 12 so as to be apart from each other to form outwardly bent portions 11a, are received in the slots 5a in a manner such that the outwardly bent portions 11a protrude from the slots 5a, before receiving the winding assemblies 7A, 7B, and 7C therein.

Therefore, the outwardly bent portions 11a bent so as to be apart from each other function as guides for receiving the winding assemblies 7A, 7B, and 7C, whereby the winding assemblies 7A, 7B, and 7C can be easily mounted because the winding assemblies 7A, 7B, and 7C are smoothly inserted by being guided by the outwardly bent portions 11a bent so as to be apart from each other. Moreover, a risk, of the winding assemblies 7A, 7B, and 7C catching the top edges of the insulator 11 and pushing the insulators 11 into the slots 5a, can be avoided.

The insulators 11 are further pushed into the slots 5a by the winding assemblies 7A, 7B, and 7C at the bottom portions 11b of the insulators 11, whereby a risk can be avoided, the risk of the winding assemblies 7A, 7B, and 7C pushing the top sides of the insulators 11 toward the bottoms of the slots 5a, thereby exposing edges of the flanges 5c in the peripheral direction. The winding assemblies 7A, 7B, and 7C are received in the slots 5a without damages to the insulating films of the strand of wire 6 of the winding assemblies 7A, 7B, and 7C generated by rubbing the strands of wire 6 against the flanges 5c and with the insulators 11 disposed between the inner walls of the slots 5a and the strands of wire 6 at the open sides of the slots 5a, whereby superior insulation can be ensured.

Since the insulators 11 are not inserted completely in the slots 5a before the winding assemblies 7A, 7B, and 7C are inserted, whereby the insulators 11 can be mounted relatively easily because the length of movement of the insulators 11 is small.

When the winding assemblies 7A, 7B, and 7C are received in the slots 5a, the open sides of the slots 5a are enclosed by the top sides of the insulators 11, because each insulator 11 is formed in the substantially U-shape in which the top sides thereof is bent so as to be apart from each other. Therefore, a risk of the strands of wire 6 falling away from the slots 5a is avoided during rolling the laminated core 5, thereby improving the efficiency in a process of rolling the laminated core 5.

Because of a method in which the rectangular laminated core 5 is rolled up in a cylinder after the winding assemblies 7A, 7B, and 7C are mounted thereon, the size of each slot 5a at the open side thereof for receiving the winding assemblies 7A, 7B, and 7C can be made large, thereby facilitating insertion of the insulators 11 and the winding assemblies 7A, 7B, and 7C.

In the stator 10 thus formed, the first creases formed by the first bent parts 12 of the insulator 11 received in each slot 5a extend along each edge of the open side of the slot 5a, and the top sides of the outwardly bent portions 11a of each insulator 11 enclosing the open side of the slot 5a are disposed between the flanges 2c and the stator winding 3, thereby ensuring the insulation of the stator winding 3 from the stator core 2.

In the stator 10 thus formed, coil end groups and the strands of wire in the slots 5a may be impregnated with a varnish. With this arrangement, the insulation between the strands of wire forming the coil end groups and between the stator winding and the stator core can be ensured, and the stator winding can be made more rigid, thereby suppressing wind noises and electromagnetic noises.

Second Embodiment

According to the first embodiment, planar winding assemblies are mounted on the rectangular parallelepiped laminated core 5, and the rectangular laminated core 5 is rolled up in a cylinder and is butt-welded by a laser at ends of the laminated core 5, thereby forming the stator 10. In contrast, according to a second embodiment, a cylindrical stator core 2 is mounted with wire-assemblies formed in cylinders, thereby forming a stator.

Figure 7:
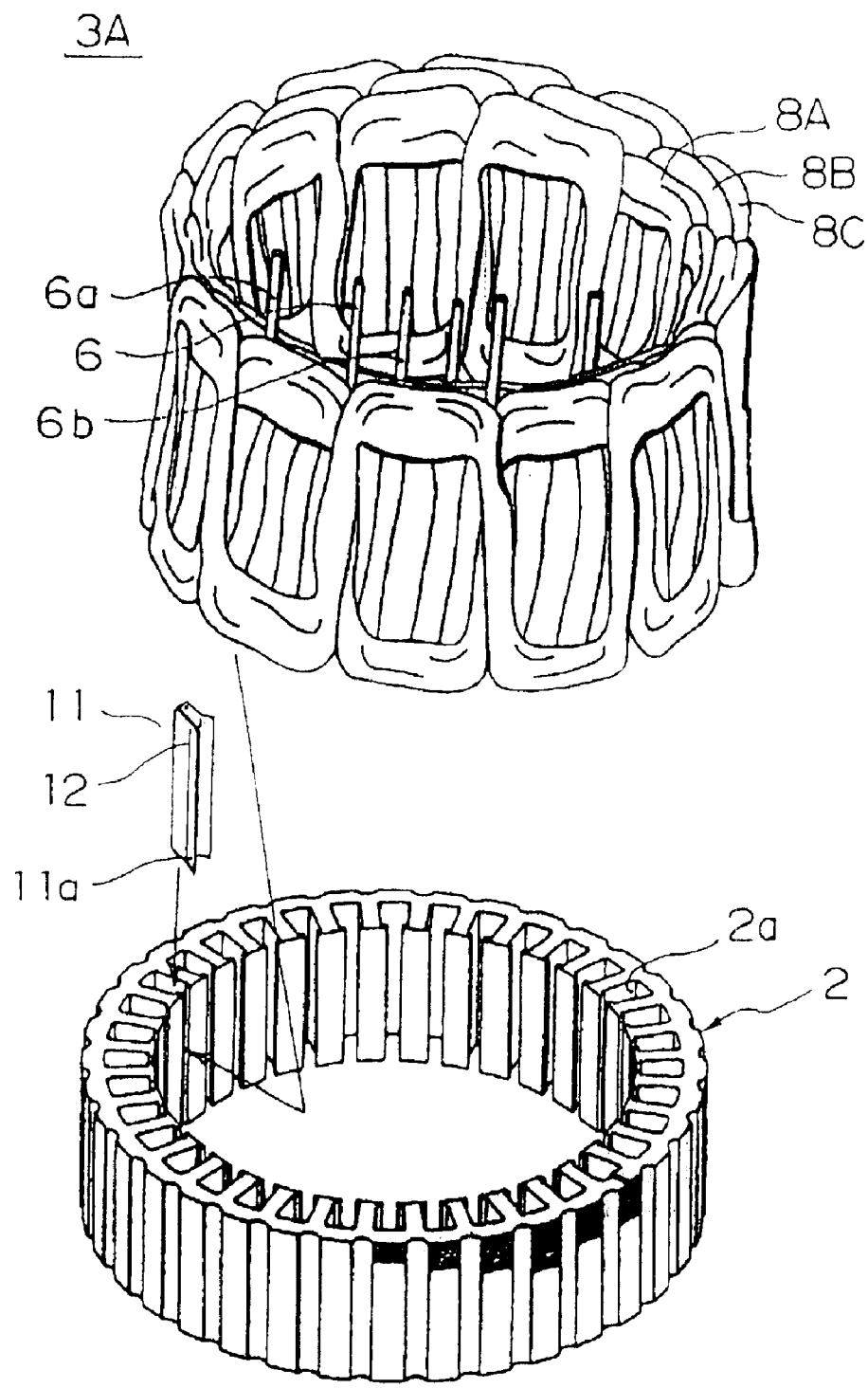
FIG. 7 is a perspective view of a stator for an automotive alternator according to a second embodiment of the present invention, showing a method for manufacturing the stator.

A method for manufacturing a stator according to the second embodiment is described below with reference to FIG. 7.

Firstly, the cylindrical stator core 2 and insulators 11 are manufactured.

A cylindrical wire-assembly 8A is formed with one strand of wire 6, made of a copper wire having a circular section and coated with an insulating film, wound in a predetermined number of waves at a three-slot pitch. The winding-starting end and the winding-finishing end of the strand of wire 6 forming the winding assembly 8A serve as a lead wire 6a and a neutral-point lead wire 6b, respectively. Winding assemblies 8B and 8C are formed with respective single strands of wire 6 wound in the same fashion as the winding assembly 8A. The winding assemblies 8A, 8B, and 8C thus formed overlap each other in three layers and being offset from each other at a one-slot pitch, thereby forming a stator winding 3A as an armature winding.

The insulators 11 are inserted in slots 2a formed in the stator core 2 in the axial direction of the stator core 2 so that outwardly bent portions 11a of the insulators 11 bent so as to be apart from each other protrude in the radial directions from the slots 2a.

The diameter of the stator winding 3A including the winding assemblies 8A, 8B, and 8C overlapping each other in three layers is reduced so as to be inserted in the stator core 2, and the stator winding 3A are inserted in the slots 2a from the open sides of the slots 2a in the radial directions, thereby manufacturing the stator.

According to the second embodiment, the substantially U-shaped insulators 11 having outwardly bent portions 11a bent at the first bent parts 12 so as to be apart from each other are mounted in the slots 2a before the stator winding 3A including the winding assemblies 8A, 8B, and 8C are inserted in the slots 2a, so that the outwardly bent portions 11a protrude in the radial directions toward the inside of the stator core 2, whereby the same effect as in the first embodiment can be obtained.

Third Embodiment

Figure 8:
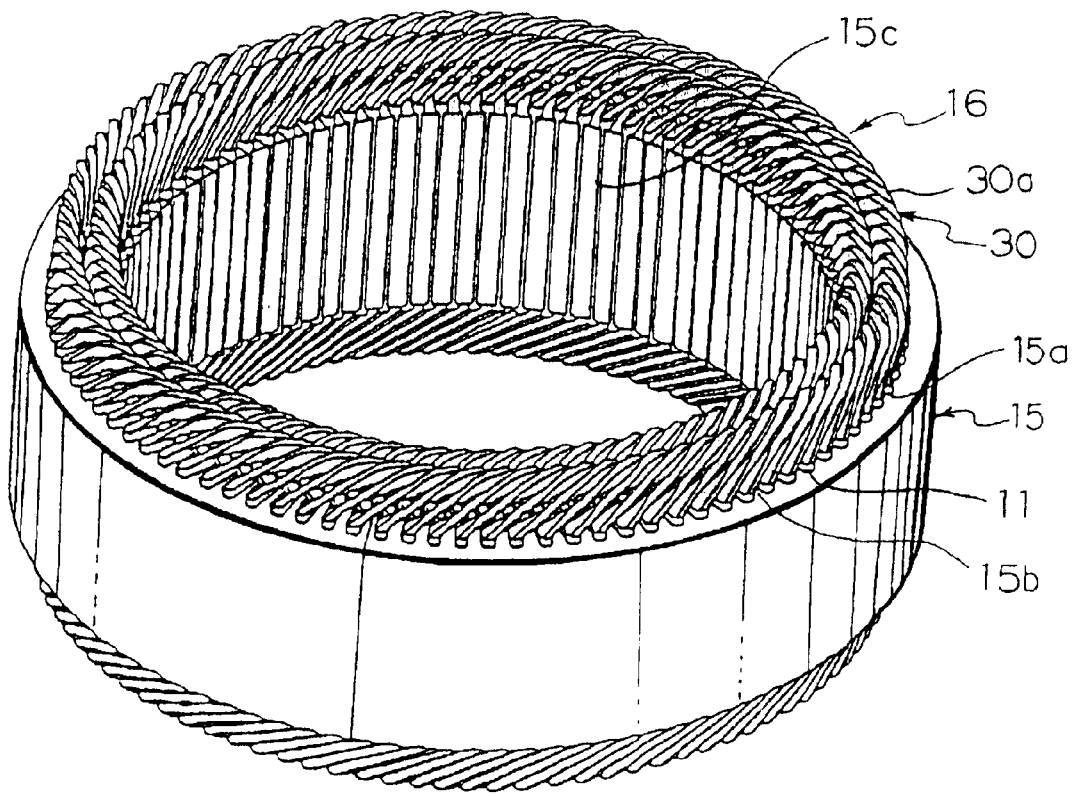
FIG. 8 is a perspective view of a stator for an automotive alternator according to a third embodiment of the present invention.
Figure 9:
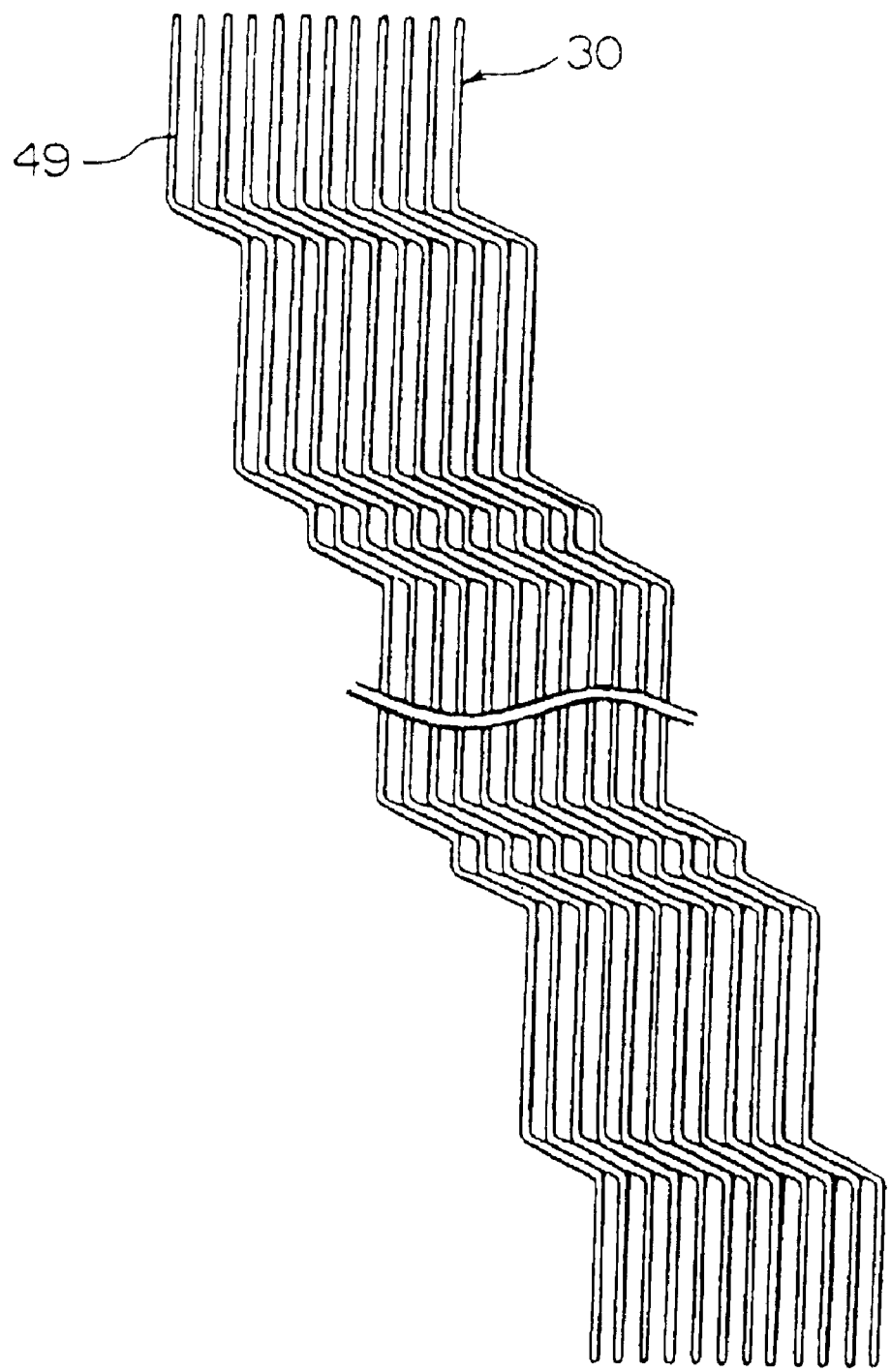
FIG. 9 is an illustration of a winding assembly for a stator winding used for the stator for an automotive alternator according to the third embodiment of the present invention, showing a process of manufacturing of the winding assembly.
Figure 10:
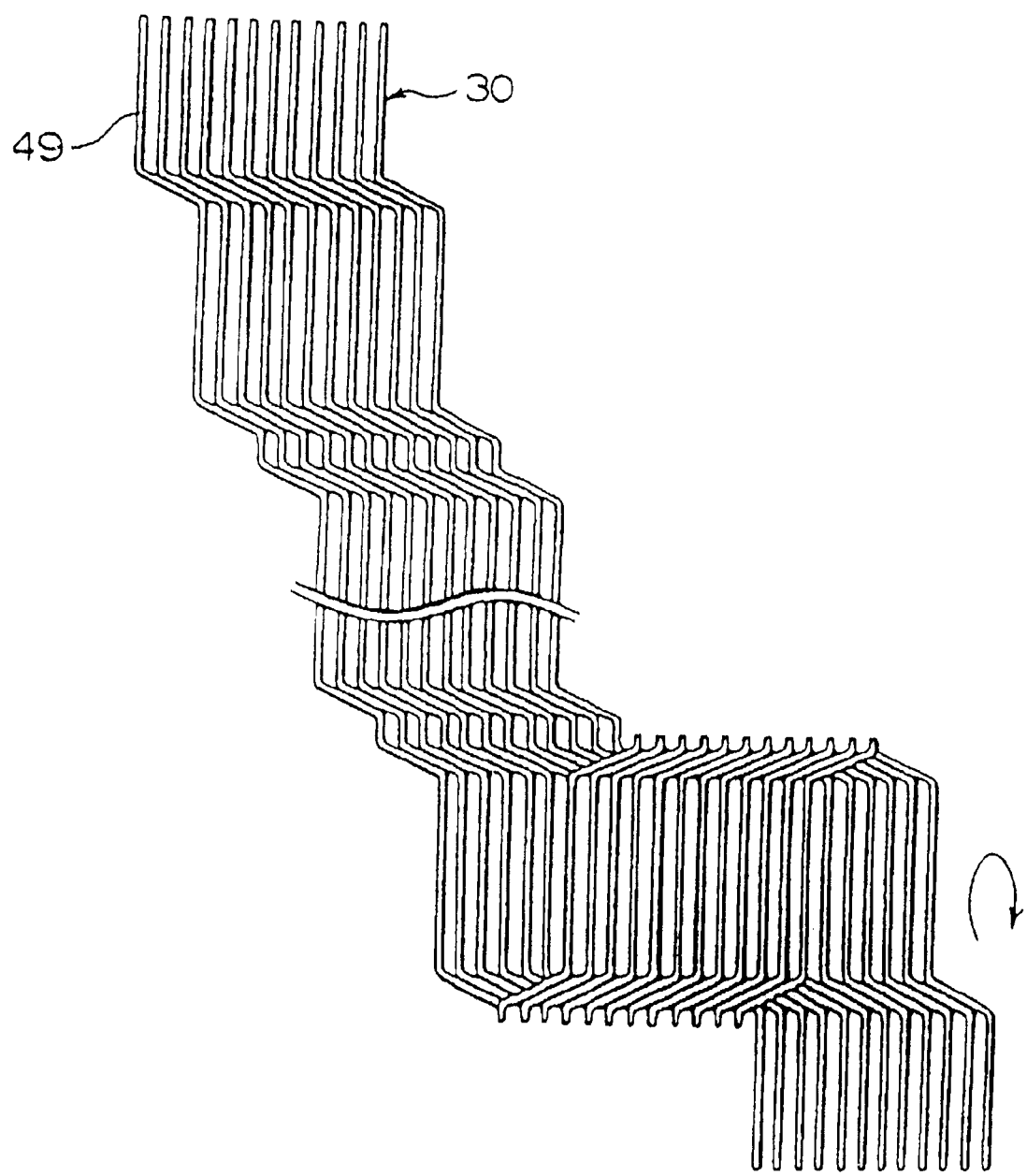
FIG. 10 is an illustration of the winding assembly for the stator winding used for the stator for an automotive alternator according to the third embodiment of the present invention, showing a process of manufacturing of the winding assembly.
Figure 11:
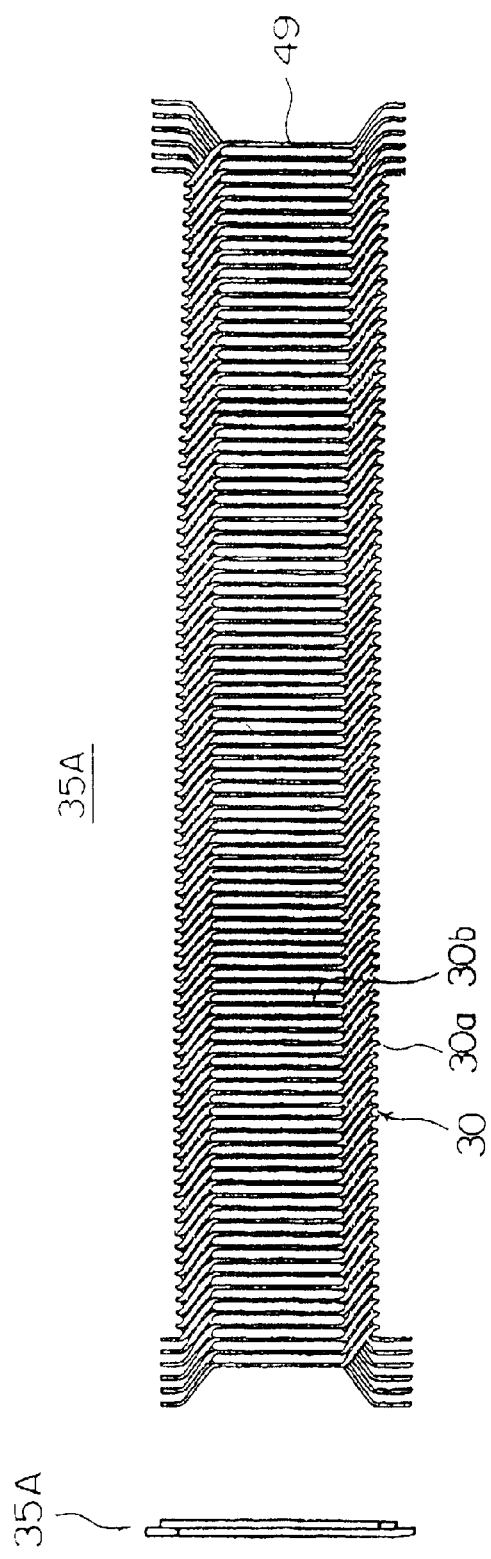
FIGS. 11A and 11B are illustrations of an inner-layer winding assembly for the stator winding used for the stator for an automotive alternator according to the third embodiment of the present invention.
Figure 12:
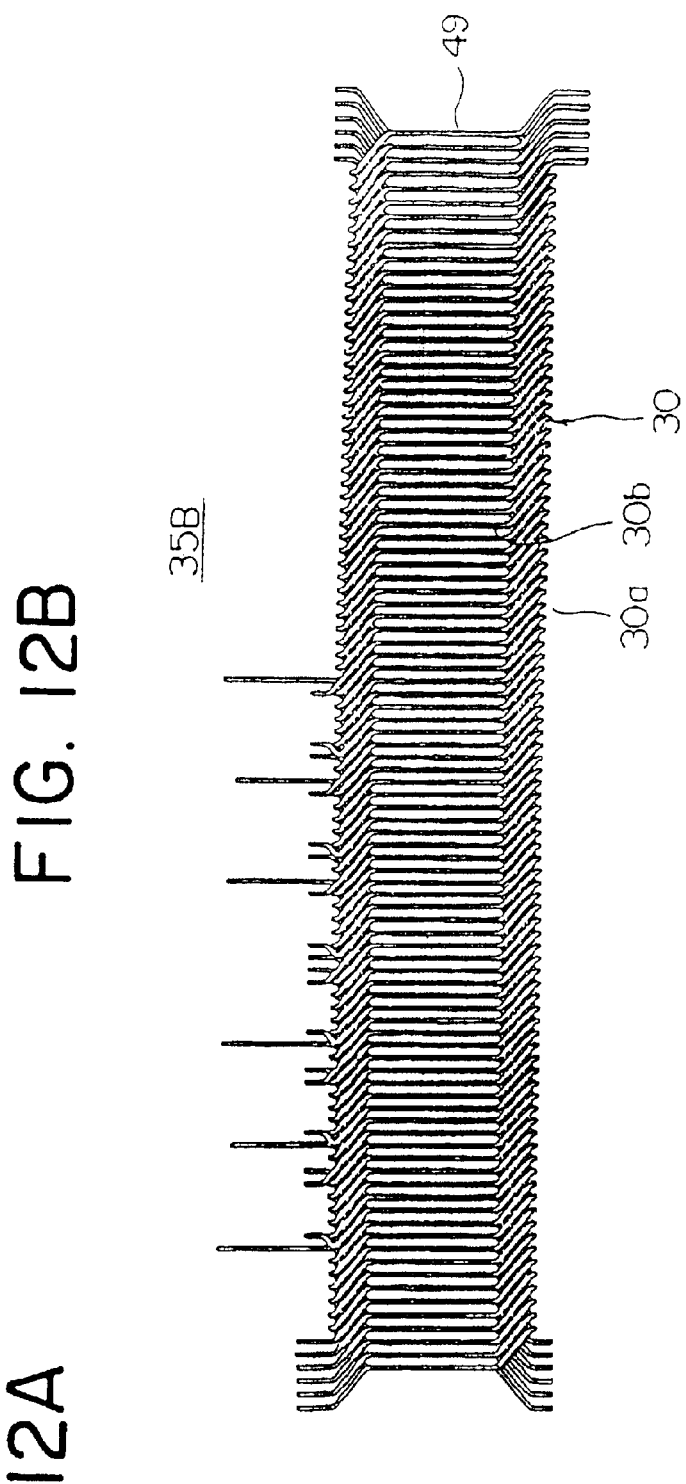
FIGS. 12A and 12B are illustrations of an outer-layer winding assembly for the stator winding used for the stator for an automotive alternator according to the third embodiment of the present invention.
Figure 13:
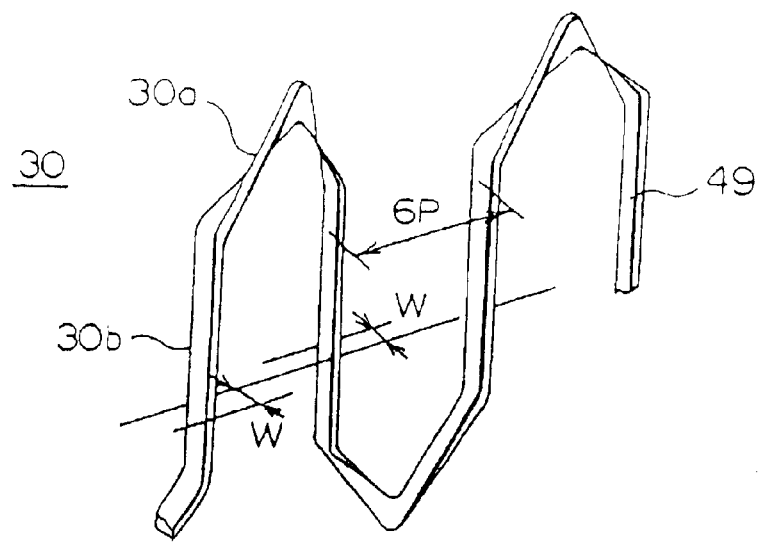
FIG. 13 is a perspective view of a critical portion of a strand of wire forming the winding assembly for the stator winding for the stator for an automotive alternator according to the third embodiment of the present invention.
Figure 14:
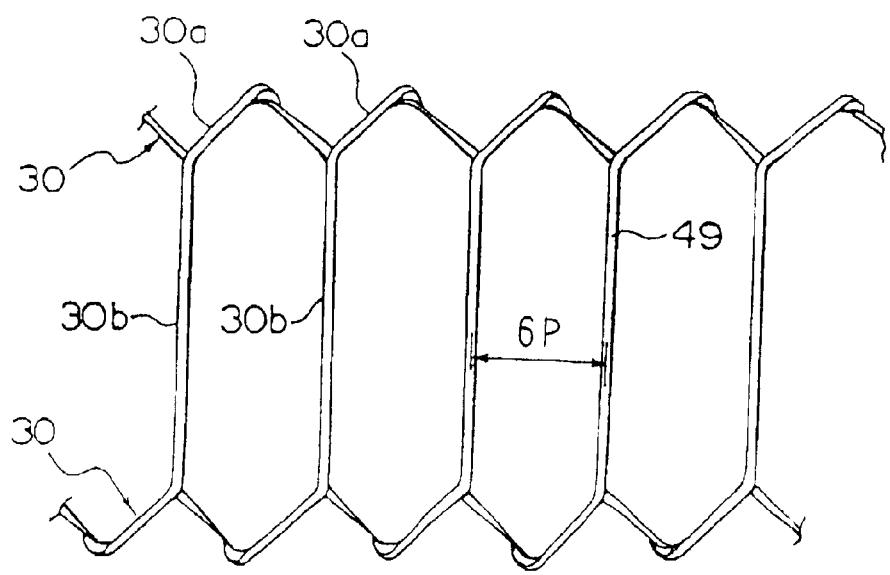
FIG. 14 is an illustration of the strands of wire forming the winding assembly for the stator winding for the stator for an automotive alternator according to the third embodiment of the present invention, showing the disposition of the strands of wire.
Figures 15A, 15B:
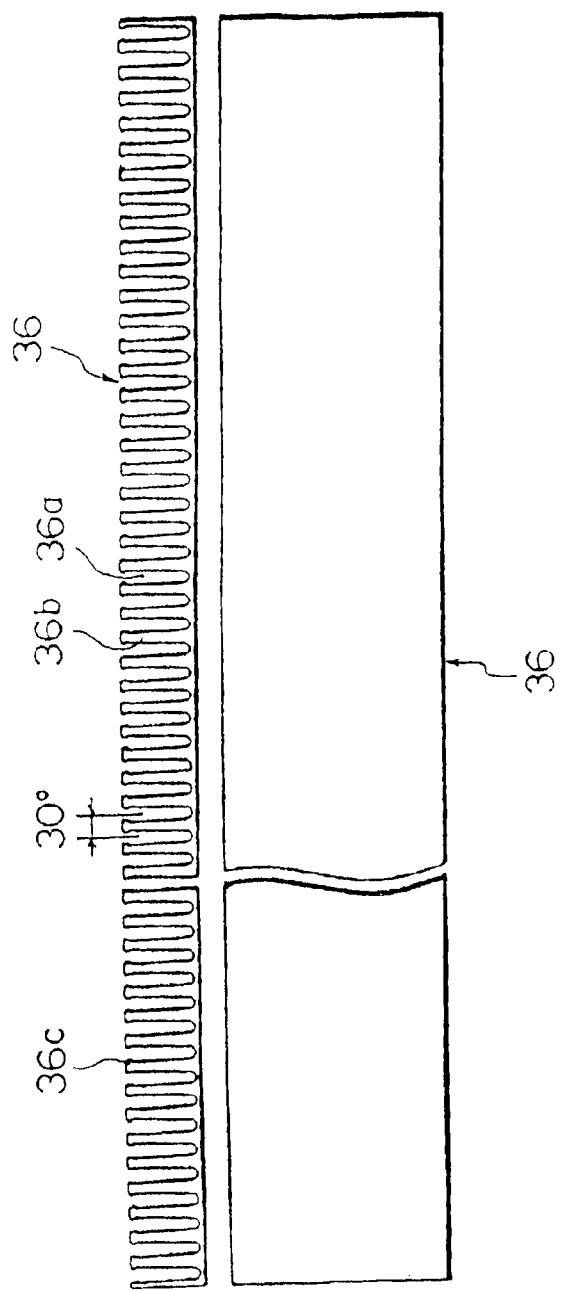
FIGS. 15A and 15B are illustrations of a laminated core forming a stator core for the stator for an automotive alternator according to the third embodiment of the present invention.
Figure 16:
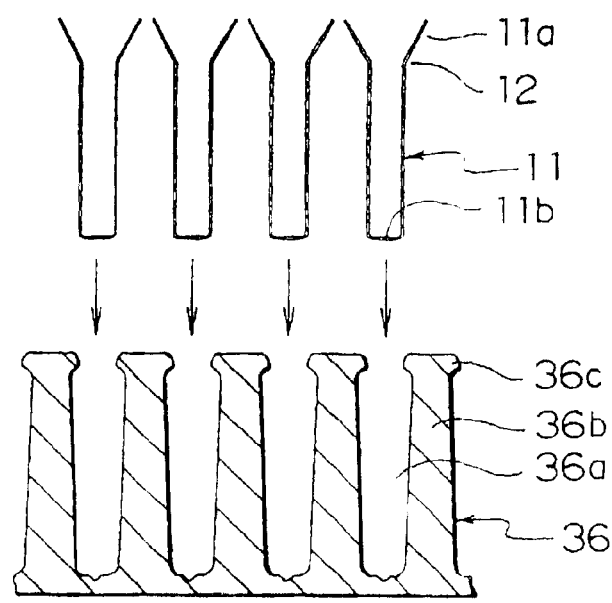
FIG. 16 is a sectional view of the stator for an automotive alternator according to the third embodiment of the present invention, showing an insulator-insertion process in manufacturing of the stator.
Figure 17:
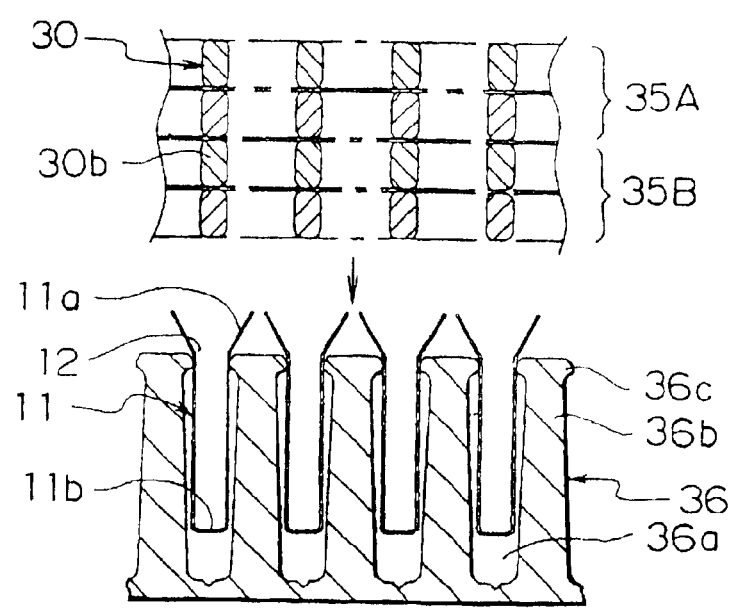
FIG. 17 is a sectional view of the stator for an automotive alternator according to the third embodiment of the present invention, showing a winding-insertion process in manufacturing of the stator.
Figure 18:
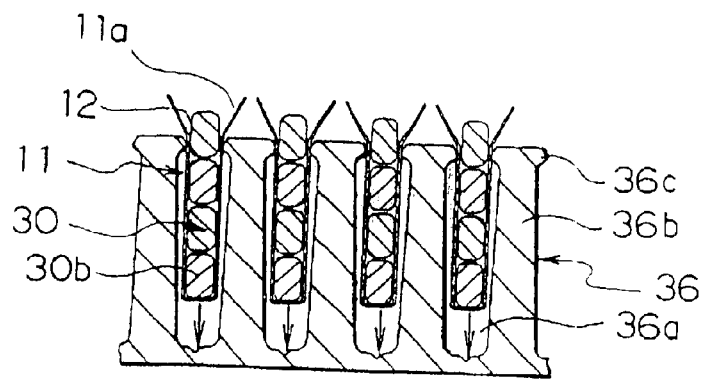
FIG. 18 is a sectional view of the stator for an automotive alternator according to the third embodiment of the present invention, showing windings being inserted in the winding-insertion process in manufacturing of the stator.
Figure 19:
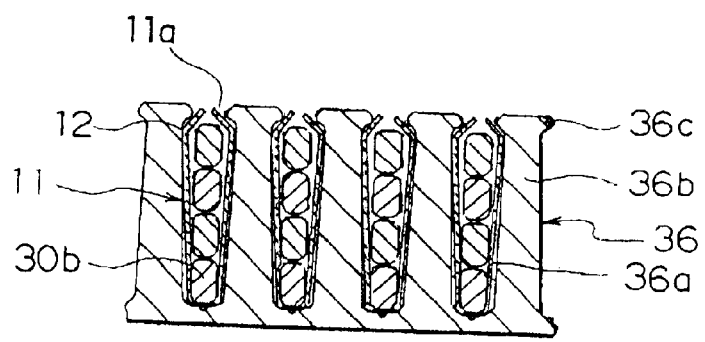
FIG. 19 is a sectional view of the stator for an automotive alternator according to the third embodiment of the present invention, showing the windings having been inserted in manufacturing of the stator.
Figure 20:
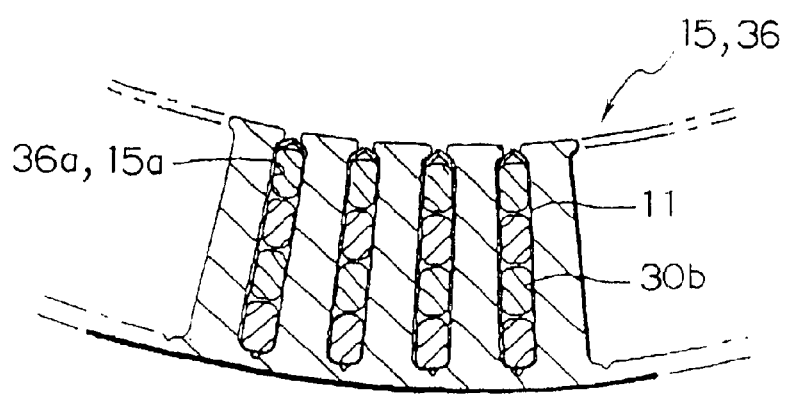
FIG. 20 is a sectional view of the stator for an automotive alternator according to the third embodiment of the present invention, showing a process in which a laminated core is rolled up during manufacturing of the stator.

FIG. 8 is a perspective view of a stator for an automotive alternator according to a third embodiment of the present invention. FIGS. 9 and 10 are illustrations of a winding assembly for a stator winding used for the stator, showing a process of manufacturing the winding assembly. FIGS. 11A and 11B are an end view and a plan view, respectively, of an inner-layer winding assembly for the stator winding used for the stator. FIGS. 12A and 12B are an end view and a plan view, respectively, of an outer-layer winding assembly for the stator winding used for the stator. FIG. 13 is a perspective view of a critical portion of a strand of wire forming the winding assembly for the stator winding for the stator. FIG. 14 is an illustration of the strands of wire forming the winding assembly for the stator winding, showing the disposition of the strands of wire. FIGS. 15A and 15B are a side view and a rear view, respectively, of a laminated core forming a stator core for the stator. FIG. 16 is a sectional view of the stator, showing an insulator-insertion process in manufacturing of the stator. FIG. 17 is a sectional view of the stator, showing a wire-insertion process in manufacturing of the stator. FIG. 18 is a sectional view of the stator, showing wires being inserted in the wire-insertion process in manufacturing of the stator. FIG. 19 is a sectional view of the stator, showing the wires having been inserted in manufacturing of the stator. FIG. 20 is a sectional view of the stator, showing a process in which a laminated core is rolled up in manufacturing of the stator. In FIG. 8, lead wires and bridge-connecting wires are omitted.

In FIG. 8, a stator 20 as an armature according to the third embodiment includes a cylindrical stator core 15 as an armature core provided with a plurality of slots 15a formed therein extending in the axial direction and disposed alongside each other in the circumferential direction at a predetermined pitch, a stator winding 16 as an armature winding mounted on the stator core 15, and insulators 11 mounted in the slots 15a for electrically insulating the stator winding 16 from the stator core 15.

Each insulator 11 is formed in a substantially U-shape, the top sides thereof being bent at first bent parts 12 of the insulator 11 so as to be apart from each other. The U-shaped insulator 11 is disposed in each slot 15a along the inner walls thereof, and the top sides of the insulator 11 are deformed by flanges 15c of teeth 15a so as to be closed to each other. First creases formed by the first bent parts 12 are disposed extending along longitudinal edges of each slots 15a at the open side thereof. The stator winding 16 include a plurality of winding sub-portions in each of which a strand of wire 30 is folded back outside the slots 15a at each axial end of the stator core 15 and is wound in a wave-shape so as to occupy alternately an inner layer and an outer layer in the slot-depth direction in the slots 15a at intervals of a predetermined number of slots. The stator core 15 is provided with ninety-six slots 15a which receive the stator winding 16 constructed with two three-phase alternating windings. The strand of wire 30 is made of, for example, a long copper wire having a rectangular section and coated with an insulating film 49.

A method for manufacturing the stator 20 is described below with reference to FIGS. 9 to 20.

Twelve long strands of wire 30 are simultaneously bent in the same plane to form a zigzag fashion, as shown in FIG. 9. Then, the strands of wire 30 are folded over at a right angle by using a jig, as shown by an arrow in FIG. 10, thereby forming an inner-layer winding assembly 35A shown in FIG. 11. In the same manner, an outer-layer winding assembly 35B having bridge-connection wires, neutral-point lead wires, and lead wires is formed, as shown in FIGS. 12A and 12B.

Each strand of wire 30 is formed by bending it into a planar pattern in which straight portions 30b connected by turn portions 30a are lined up at a distance of a six-slot pitch. The adjacent straight portions 30b are offset from each other by the turn portions 30a by a width W of the strand of wire 30. The winding assemblies 35A and 35B are constructed by arranging six pairs of the strands of wire 30 so as to offset from each other by a slot, each pair of the strands of wire 30 constituting two strands of wire 30 formed in the above-described pattern which are offset by a six-slot pitch and arranged such that the straight portions 30b overlap each other, as shown in FIG. 14. Six ends of the strands of wire 30 each extend outwards from each side and at each end of the winding assemblies 35A and 35B. The turn portions 30a are arranged so as to line up in rows at both side portions of the winding assemblies 35A and 35B.

A rectangular laminated-core 36 shown in FIGS. 15A and 15B is formed with a predetermined number of SPCC plates laminated on each other provided with slots 36a having a trapezoidal cross-section formed at a predetermined pitch (an electrical angle of 30 degrees), the laminated SPCC plates being welded by a laser at the periphery thereof.

In FIG. 16, the insulators 11 are inserted in the slots 36a from the open sides thereof until the root portions of the outwardly bent portions 11a near the first bent parts 12 of the insulators 11 are brought into contact with flanges 36c formed at the edges of teeth 36b. The insulators 11 are mounted in the slots 36a in a manner such that the outwardly bent portions 11a thereof protrude outside from the slots 36a. In FIG. 17, the winding assemblies 35A and 35B overlapping each other are inserted in the slots 36a from the open sides thereof at the straight portions 30b of the strands of wire 30 forming the winding assemblies 35A and 35B. In this case, the winding assemblies 35A and 35B are inserted into the insulators 11 disposed in the slots 36a by being guided at the straight portions 30b of the strands of wire 30 by the outwardly bent portions 11a bent so as to be apart from each other. When the winding assemblies 35A and 35B reach bottom portions 11b of the insulators 11, the insulators 11 are pushed toward the bottoms of the slots 36a together with the winding assemblies 35A and 35B, as shown in FIG. 18, and the insulators 11 come into contact with the bottoms of the slots 36a. In FIG. 19, the winding assemblies 35A and 35B are mounted on the laminated core 36 so that a pair of the outwardly bent portions 11a of each insulator 11 bent so as to be apart from each other are deformed in a manner such that the outwardly bent portions 11a pushed so as to be close to each other by the flanges 5c of the teeth 5b, thereby enclosing the open side of each slot 36a. Four straight portions 30b of the strands of wire 30 are disposed alongside each other in each slot 36a in the radial direction, insulated by the insulator 11 from the laminated core 36.

The laminated core 36 mounted with the winding assemblies 35A and 35B is rolled up in a cylinder by a forming device (not shown), as shown in FIG. 20. The laminated core 36 is butt-welded by a laser at ends thereof, thereby obtaining the stator 20 shown in FIG. 8.

In the stator 20 thus formed, the winding assembly 35A includes twelve strands of wire 30, each strand of wire 30 being connected at the ends thereof, thereby forming a winding sub-portion in one turn. First winding sub-portions formed with six strands of wire 30 wound in a wave-shape by being offset from each other by a one-slot pitch are mounted in slots 15a in a manner such that each strand of wire 30 occupies alternately a first position from an inner circumferential side (hereinafter, referred to as a first address) and a second position from the inner circumferential side hereinafter, referred to as a second address) in every sixth slot 15a. Second winding sub-portions formed with the remaining six strands of wire 30 wound in a wave-shape by being offset from each other by a one-slot pitch are mounted in the slots 15a in a manner such that each strands of wire 30 occupies alternately the second address and the first address in every sixth slot 15a. Each pair of the first winding sub-portion and the second winding sub-portion is disposed in the same slot group constructed with the slots 15a arranged at intervals of six slots, and the second winding sub-portions are inversely wound and offset by an electrical angle of 180 degrees relative to the first winding sub-portions.

In the same fashion, the winding assembly 35B includes twelve strands of wire 30, each strand of wire 30 being connected at the ends thereof, thereby forming a winding sub-portion in one turn. Third winding sub-portions formed with six strands of wire 30 wound in a wave-shape by being offset from each other by a one-slot pitch are mounted in the slots 15a in a manner such that each strands of wire 30 occupies alternately a third position form the inner circumferential side (hereinafter, referred to as a third address) and a fourth position form the inner circumferential side (hereinafter, referred to as a fourth address) in every sixth slot 15a. Fourth winding sub-portions formed with the remaining six strands of wire 30 wound in a wave-shape by being offset from each other by a one-slot pitch are mounted in the slots 15a in a manner such that each strand of wire 30 occupies alternately the fourth address and the third address in every sixth slot 15a. Each pair of the third winding sub-portion and the fourth winding sub-portion is disposed in the same slot group constructed with the slots 15a arranged at intervals of six slots, the fourth winding sub-portions are inversely wound and offset by an electrical angle of 180 degrees relative to the third winding sub-portions.

The first to fourth winding sub-portions disposed in the same slot group are connected to each other in series, thereby forming six winding phase groups, each in four turns. Two three-phase alternating windings are formed, each being formed by connecting three winding phase groups into an alternating connection.

According to the third embodiment, the substantially U-shaped insulators 11 having the outwardly bent portions 11a formed by bend the top sides thereof at the first bent parts 12 so as to be apart from each other are mounted in the slots 36a in a manner such that the outwardly bent portions 11a protrude outside the slots 36a for receiving the winding assemblies 35A and 36B, thereby providing the same effect as provided in the first embodiment.

In the first embodiment, the stator winding 3 constructed with the winding assemblies 7A, 7B, and 7C configured with the strands of wire 6 wound in a predetermined number of waves, in which the strands of wire 6 are disposed irregularly in the slots 2a and at coil-end groups (outside the slots 2a). The strands of wire 6 do not occupy particular positions in the slots 2a and at the outside of the slots 2a, whereby the stator winding of which coil ends are arranged in order cannot be obtained. Large projections and recesses (circumferential irregularities) are formed at the inner faces of the coil-end groups, and the protrusion of the coil-end groups is made large. When the stator is mounted in an automotive alternator, a problem arises in that wind noises increase due to the circumferential irregularities formed at the inner faces of the coil-end groups, and leakage reactance at the coil ends and the wind resistance against cooling air increase due to the coil-end groups increased in protrusion.

In contrast, the stator winding 16 according to the third embodiment is composed of a plurality of wave windings each formed with the strand of wire 30 wound occupying alternately an inner layer and an outer layer in every sixth slot 15a, whereby the turn portions 30a of the strands of wire 30 can be made in the same shape as each other and can be disposed alongside each other and overlapping each other in the circumferential direction. Therefore, the circumferential irregularities of the inner faces of the coil-end groups formed with the turn portions 30a can be reduced, thereby reducing wind noises, when mounted in an automotive alternator, due to circumferential irregularities of the inner faces of the coil-end groups.

Four strands of wire 30 are disposed in each slot 15a alongside each other in the radial direction, and the turn portions 30a are disposed in two rows formed alongside in the circumferential direction. The protrusion of the coil-end from each axial end of the stator core 15 can be reduced by dividing the turn portions 30a forming the coil-end group into two rows alongside in the radial directions. Therefore, wind noises can be reduced when the stator is mounted in an automotive alternator, and leakage reactance at the coil ends is reduced, thereby increasing the output and improving the efficiency.

Since each straight portion 30b of the strand of wire 30 has a rectangular cross-section, the cross-sectional shape of the straight portions 30b exactly fits into the shape of the slots 15a when the straight portions 30b are received in the slots 15a. Therefore, the space factor of the strands of wire 30 in the slots 15a can be easily increased, and the thermal transmission from the strands of wire 30 to the stator core 15 can be improved.

The number of turns of the stator winding 16 can be easily increased because the winding assemblies 35A and 35B are used. The winding assemblies 35A (35B) is constituted by a winding assembly into which a pair of first and second winding groups is assembled before insertion in the slots. The first winding group comprises six first winding sub-portions each having one turn constructed by winding a stand of wire 30 so as to alternately occupy an inner layer and an outer layer in a slot depth direction in every six slots 15a, the first winding sub-portions being disposed at a pitch of one slot from each other. The second winding group comprises six second winding sub-portions each having one turn constructed by winding a stand of wire 30 so as to alternately occupy an inner layer and an outer layer in a slot depth direction in every six slots 15a and so as to be inversely wound and offset by an electrical angle of 180 degrees relative to the first winding sub-portions, the second winding sub-portions being disposed at a pitch of one slot from each other.

Fourth Embodiment

According to a fourth embodiment, a substantially U-shaped insulator 11A, having outwardly bent portions 11a formed by bend the top sides thereof at the first bent parts 12 so as to be apart from each other and a concave bottom portion 11c at the bottom thereof, is used. The other configuration is the same as that which is described in the third embodiment.

Figure 21:
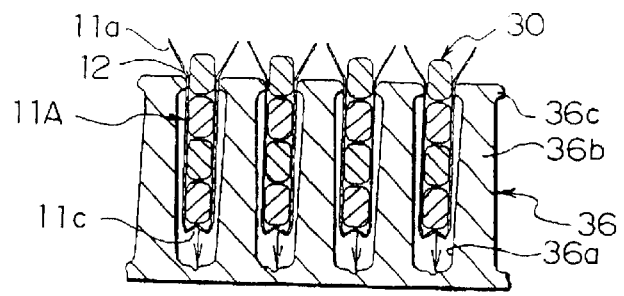
FIG. 21 is a sectional view of a stator for an automotive alternator according to a fourth embodiment of the present invention, showing windings being inserted in a winding-insertion process in manufacturing of the stator.
Figure 22:
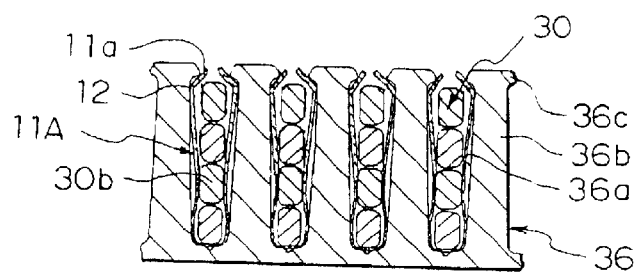
FIG. 22 is a sectional view of the stator for an automotive alternator according to the fourth embodiment of the present invention, showing the windings having been inserted in manufacturing of the stator.

According to the fourth embodiment, the insulators 11A are mounted in slots 36a with outwardly bent portions 11a of the insulators 11A bent so as to be apart from each other protruding outside the slots 36a. Two winding assemblies 35A and 35B overlapping each other are inserted in the slots 36a at the straight portions 30b of strands of wire 30 from the open sides of the slots 36a. When the winding assemblies 35A and 35B reach the concave bottom portions 11c of the insulators 11A, the insulators 11A are pushed toward the bottoms of the slots 36a by the winding assemblies 35A and 35B, as shown in FIG. 21, until the insulators 11A come into contact with the bottoms of the slots 36a. In FIG. 22, the concave bottom portions 11c of the insulators 11A are made flat by being extended in the circumferential direction so as to fit the bottoms of the slots 36a, whereby the insulators 11A are brought into close contact with the inner faces of the slots 36a.

Then, the laminated core 36 mounted with the winding assemblies 35A and 35B is rolled up in a cylinder by a forming device (not shown), and is butt-welded by a laser at ends thereof, thereby obtaining a stator.

According to the fourth embodiment, when the winding assemblies 35A and 35B are inserted completely in the slots 36a, the insulators 11A are pushed at the concave bottom portions 11c thereof by the assemblies 35A and 35B so that the concave bottom portions 11c are extended in the circumferential direction and fit the bottoms of the slots 36a, whereby the insulators 11A are brought into close contact with the inner faces of the slots 36a. Therefore, the insulators 11A do not move in the slots 36a. Further, the side portions of the insulator 11A is prevented from shifting each other in the slot depth direction. Therefore, flanges 36c of teeth 36b are not exposed, thereby avoiding damages to the insulating films of the strands of wire 30 due to direct contact between the strands of wire 30 and the flanges 36c. The insulators 11A hardly fall away from slots 15a of a stator 15, thereby improving the insulation.

In the stator thus formed according to the fourth embodiment, the bottom portion of each insulator 11A is expanded in the circumferential direction, thereby fitting the slot 15a, whereby the movement of the insulators 11A in the slots 15a is restricted. Therefore, the insulation between the stator winding and the stator core is ensured for a long period.

Although according to the fourth embodiment, the insulators 11A are provided with the concave bottom portions 11c formed in a concave shape, each insulator 11A may have a bottom portion having a convex shape, or the bottom portion may be formed in a convex and concave shape.

Fifth Embodiment

According to a fifth embodiment, a substantially U-shaped insulator 11B, having outwardly bent portions 11a formed by bend the top sides thereof at first bent parts 12 so as to be apart from each other, the outwardly bent portions 11a being bent at second bent parts 13 so as to be close to each other, is used. The first and second bent parts 12 and 13 of a first side portion of each insulator 11B are positioned toward the bottom portion 11b of the insulator 11B with respect to the first and second bent parts 12 and 13, respectively, of a second side portion of the insulator 11B, that is, the top edge of the first side portion is formed shorter than that of the second side portion. The distance between the first bent parts 12 of each insulator 11B is smaller than that between the top edges of the outwardly bent portions 11a of the first and second side portions, whereby the overall outwardly bent portions 11a of each insulator 11B are formed toward the outside so as to be apart from each other. The other configuration is the same as that which is described in the third embodiment.

Figure 23:
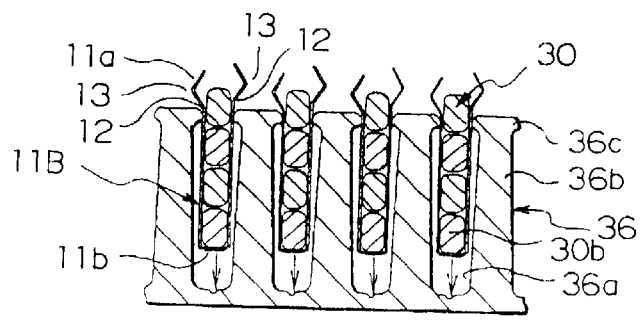
FIG. 23 is a sectional view of a stator for an automotive alternator according to a fifth embodiment of the present invention, showing windings being inserted in a winding-insertion process in manufacturing of the stator.

According to the fifth embodiment, the insulators 11B are mounted in slots 36a with the outwardly bent portions 11a of the insulators 11B protruding outside the slots 36a. Then, winding assemblies 35A and 35B overlapping each other are inserted at straight portions 30b of strands of wire 30 in the slots 36a from the open sides thereof. When the winding assemblies 35A and 35B reach the bottom portions 11b of the insulators 11B, the insulators 11B are pushed toward the bottoms of the slots 36a together with the winding assemblies 35A and 35B, as shown in FIG. 23, and are brought into contact with the bottoms of the slots 36a.

Figure 24:
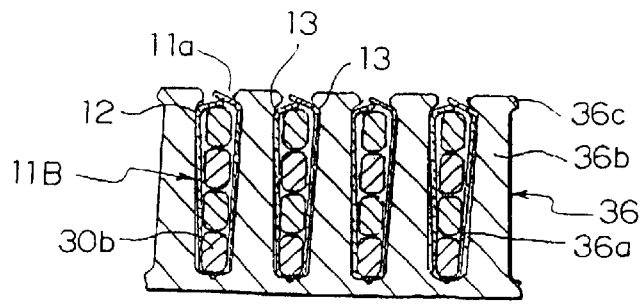
FIG. 24 is a sectional view of the stator for an automotive alternator according to the fifth embodiment of the present invention, showing the windings having been inserted in manufacturing of the stator.

As the winding assemblies 35A and 35B is inserted in the slots 36a, the first bent part 12 of the first outwardly bent portion 11a of each insulator 11B withdraws into the slot 36a from a first flange 36c and the first outwardly bent portion 11a is bent toward the inside. Soon after, the first bent part 12 of the second outwardly bent portion 11a of the insulator 11B withdraws into the slot 36a from a second flange 36c and the second outwardly bent portion 11a is bent toward the inside. Next, the second bent part 13 of the first outwardly bent portion 11a of the insulator 11B withdraws into the slot 36a from the first flange 36c and the first outwardly bent portion 11a is further bent so as to enclose the open side of the slot 36a. Soon after, the second bent part 13 of the second outwardly bent portion 11a of the insulator 11B withdraws into the slot 36a from the second flange 36c and the second outwardly bent portion 11a is further bent so as to enclose the open side of the slot 36a. In FIG. 24, the first and second outwardly bent portions 11a of each insulator 11B overlapping each other in the slot-depth direction enclose the open side of each slot 36a.

A laminated core 36 mounted with the winding assemblies 35A and 35B is rolled up in a cylinder by a forming device (not shown), and is butt-welded by a laser at ends of the laminated core 36, thereby forming a stator.

According to the fifth embodiment, the first and second outwardly bent portions 11a of each insulator 11B are formed in an L-shape by bending at the first and second bent parts 12 and 13, the first and second bent parts 12 and 13 of the first outwardly bent portion 11a are positioned toward the bottom portion 11b of the insulator 11B with respect to the first and second bent parts 12 and 13 of the second outwardly bent portion 11a, and the top edge of the first outwardly bent portion 11a is positioned toward the bottom portion 11b with respect to the top edge of the second outwardly bent portion 11a. With this arrangement, a time difference of bending between the first and second outwardly bent portions 11a occurs when the insulators 11B are inserted in the slots 36a together with the winding assemblies 35A and 35B, whereby the first and second outwardly bent portions 11a can overlap each other for enclosing the open sides of the slots 36a. Therefore, the strands of wire 30 can be surely prevented from falling away from the slots 36a during rolling the laminated core 36, thereby improving the efficiency in the rolling operation of the laminated core 36.

In spite of being provided with the second bent parts 13, the overall outwardly bent portions 11a of each insulator 11B are maintained to be apart from each other, thereby functioning as a guide for the insertion of the winding assemblies 35A and 35B, because the distance between the top edges of the outwardly bent portions 11a is greater than that between the first bent parts 12 of each insulator 11B.

In the stator thus formed, first and second creases formed by the first and second bent parts 12 and 13 of the first outwardly bent portion 11a of each insulator 11B are shifted toward the bottom portion of the insulator 11B with respect to first and second creases formed by the first and second bent parts 12 and 13 of the second outwardly bent portion 11a of the insulator 11B, the top sides of the first and second outwardly bent portions 11a overlapping so as to enclose the open side of the slot 36a. With this arrangement, damages to insulating films of the stator winding due to the friction between the flanges 36c of the teeth and the stator winding can be suppressed, whereby the insulation between the stator winding and the stator core can be ensured for a long period.

Sixth Embodiment

According to a sixth embodiment, a U-shaped insulator 11C is formed in a manner such that the insulator 11C have outwardly bent portion formed by bending top sides of the side portions at bent parts 12 so as to be apart from each other and has a depth sufficient to receive two strands of wire 30 alongside each other in the depth direction. The other configuration is the same as that which is described in the third embodiment.

First insulators 11C according to the sixth embodiment are mounted in slots 36a with outwardly bent portions 11a thereof protruding from the slots 36a. Then, a winding assembly 35B is inserted at straight portions 30b of strands of wire 30 in the slots 36a from the open sides of the slots 36a. When the winding assembly 35B reaches bottom portions 11b of the first insulators 11C, the first insulators 11C are pushed together with the winding assembly 35B toward the bottoms of the slots 36a, and are brought into contact with the bottoms of the slots 36a.

Figure 25:
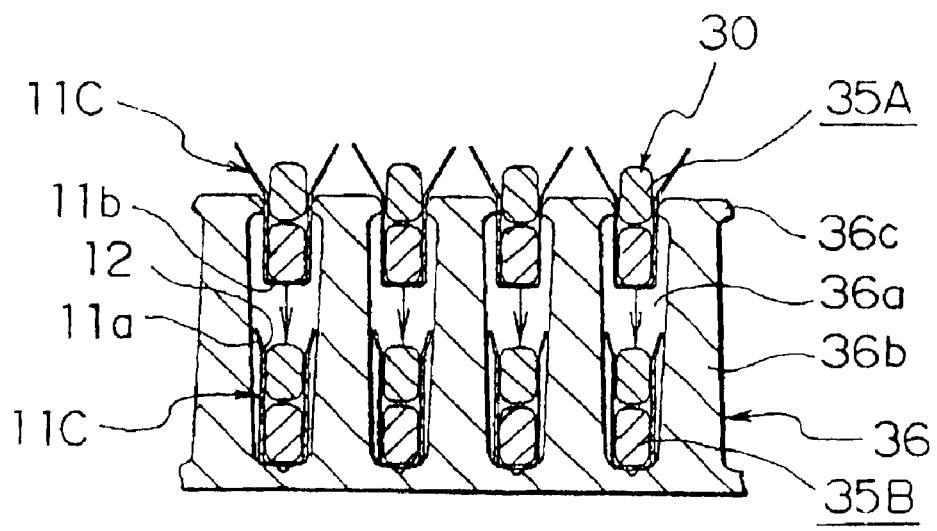
FIG. 25 is a sectional view of a stator for an automotive alternator according to a sixth embodiment of the present invention, showing windings being inserted in a winding-insertion process in manufacturing of the stator.
Figure 26:
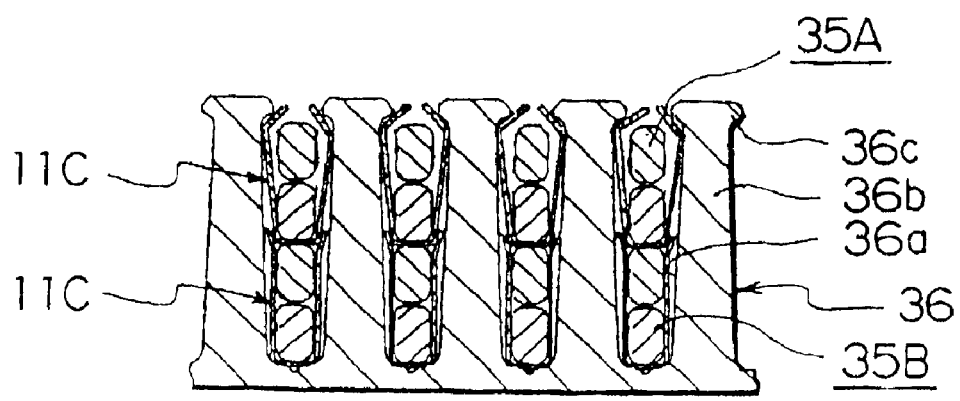
FIG. 26 is a sectional view of the stator for an automotive alternator according to the sixth embodiment of the present invention, showing the windings having been inserted in manufacturing of the stator.
Figure 27:
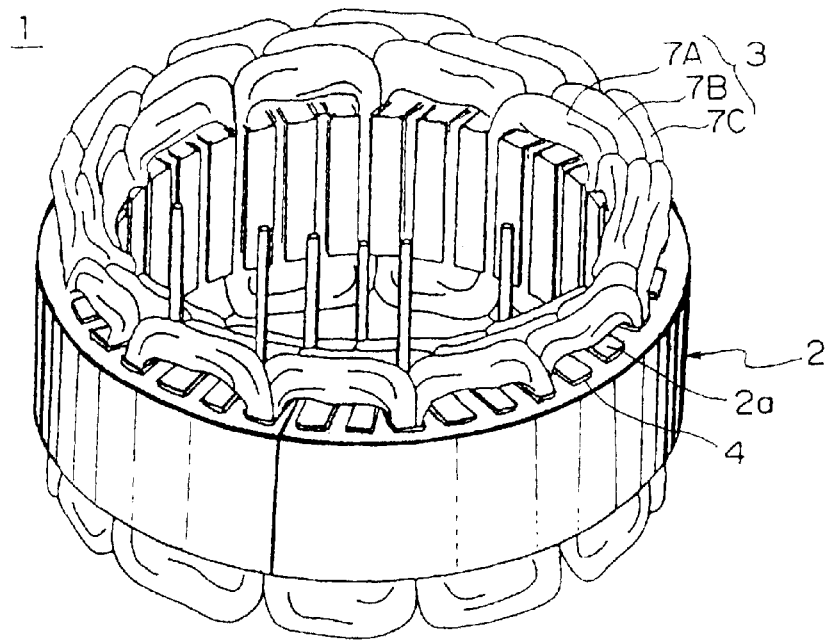
FIG. 27 is a perspective view of a known stator for an automotive alternator.
Figure 28:
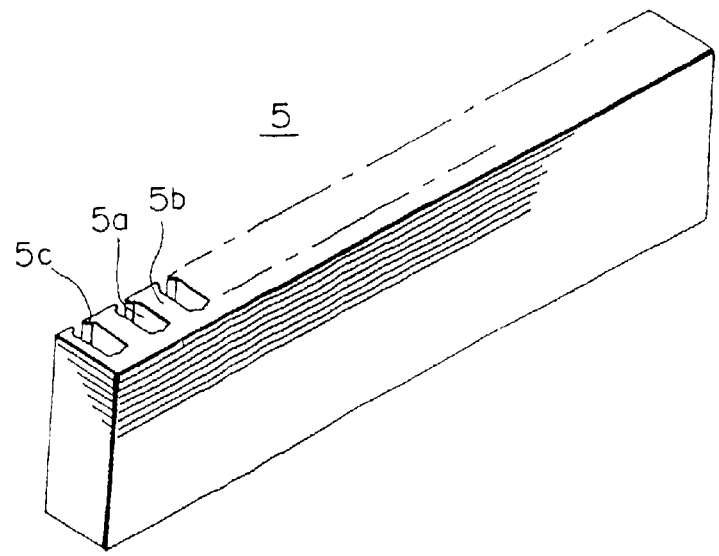
FIG. 28 is a perspective view of a rectangular parallelepiped laminated core forming the known stator.
Figure 29:
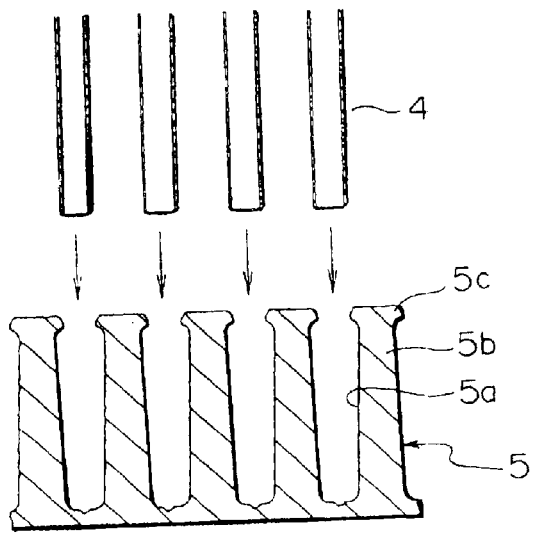
FIG. 29 is a sectional view of the known stator for an automotive alternator, showing an insulator-insertion process in manufacturing of the stator.
Figure 30:
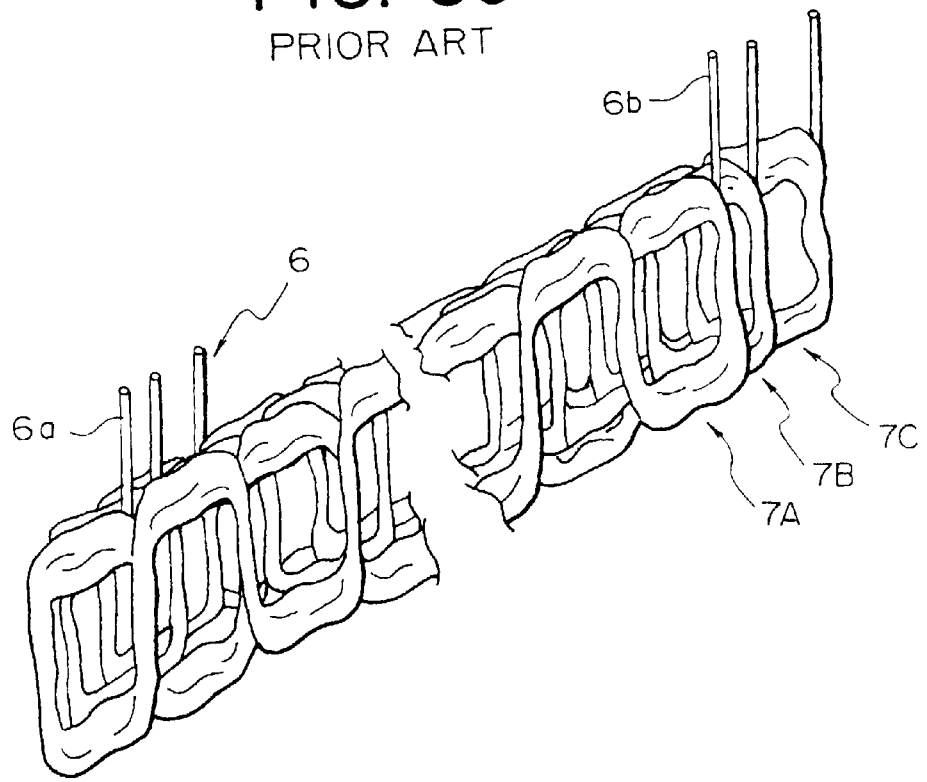
FIG. 30 is a perspective view of a stator winding for the known stator before being mounted thereon.
Figure 31:
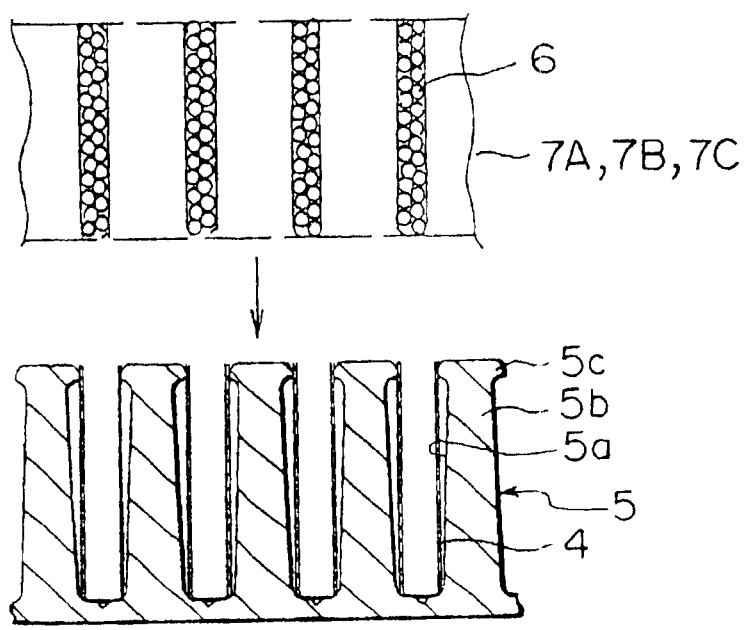
FIG. 31 is a sectional view of the known stator for an automotive alternator, showing a winding-insertion process in manufacturing of the stator.
Figure 32:
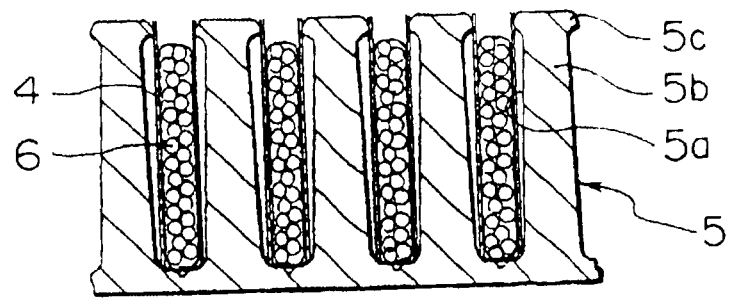
FIG. 32 is a sectional view of the known stator for an automotive alternator, showing the windings having been inserted in manufacturing of the stator.
Figure 33:
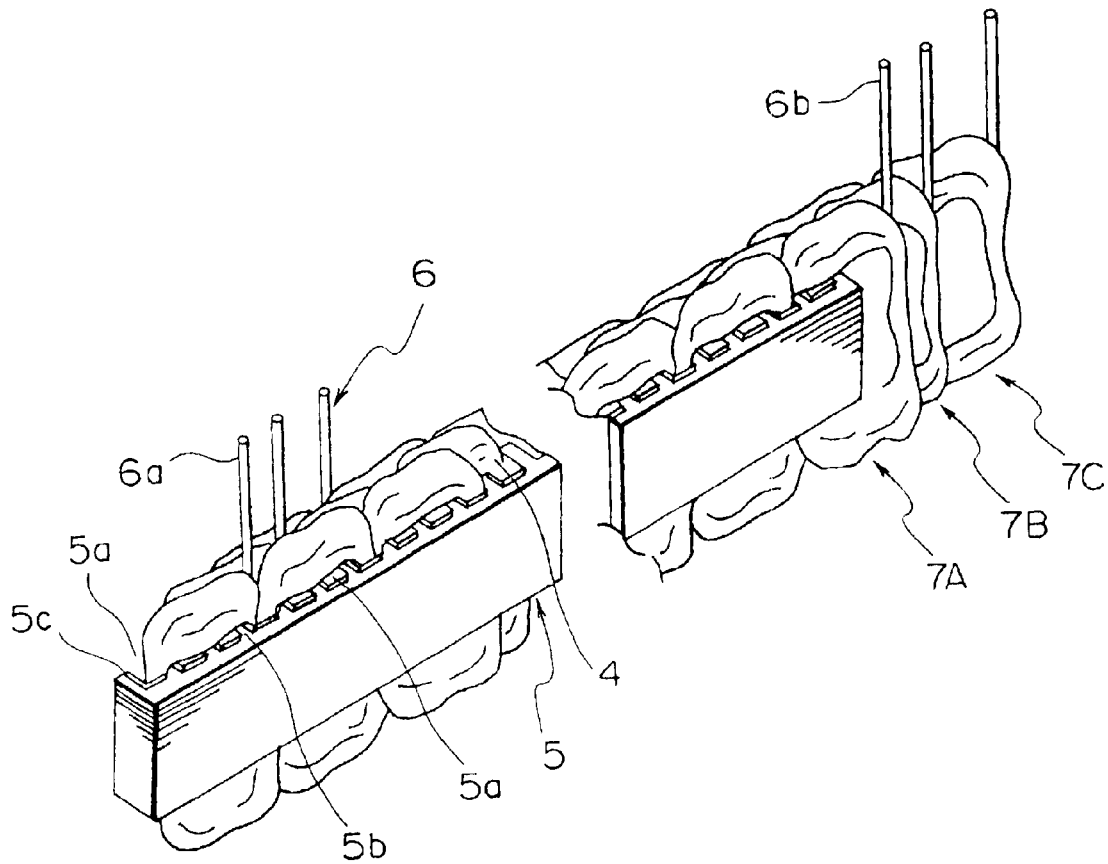
FIG. 33 is a perspective view of the known stator for an automotive alternator, showing a state in which the windings are inserted in manufacturing of the stator.
Figure 34:
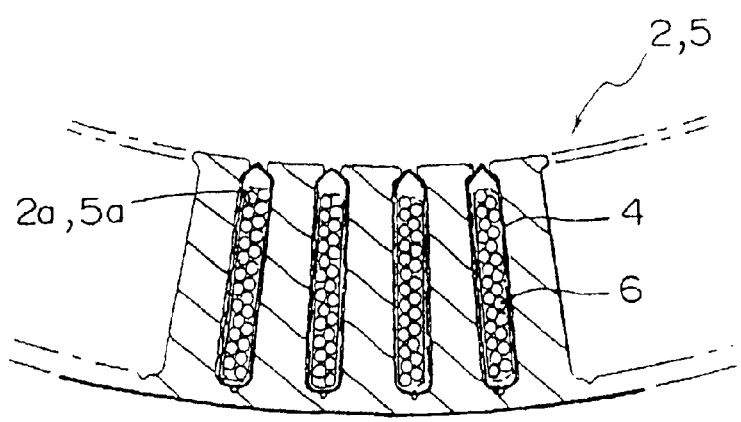
FIG. 34 is a sectional view of the known stator for an automotive alternator, showing a process in which a laminated core is rolled up in manufacturing of the stator.

Second insulators 11C are mounted in the slots 36a with the outwardly bent portions 11a thereof protruding from the slots 36a. Then, a winding assembly 35A is inserted at the straight portions 30b of the strands of wire 30 in the slots 36a from the open sides of the slots 36a. When the winding assembly 35A reaches the bottom portions 11b of the second insulators 11C, as shown in FIG. 25, the second insulators 11C are pushed together with the winding assembly 35A toward the bottoms of the slots 36a, and are brought into contact with the winding assembly 35B. Thus, the winding assemblies 35A and 35B and the first and second insulators 11C are mounted on a laminated core 36. In FIG. 26, the winding assembly 35B is insulated from the laminated core 36 by the first insulators 11C and the winding assembly 35A is insulated from the laminated core 36 by the second insulators 11C. The winding assemblies 35A and 35B are insulated from each other by the bottom portions 11b of the second insulators 11C.

The laminated core 36 mounted with the winding assemblies 35A and 35B is rolled up in a cylinder by a forming device (not shown), and is butt-welded by a laser at ends of the laminated core 36, thereby obtaining a stator.

According to the sixth embodiment, windings are mounted in units of two turns, that is, the winding assemblies 35A and 35B are inserted individually, whereby the winding assemblies 35A and 35B are inserted easily. The bottom portions 11b of the insulators 11C are disposed between the winding assemblies 35A and 35B, thereby improving the insulation.

Although according to the third to sixth embodiments, copper wires having a rectangular cross-section are used as the strands of wire 30, the strand of wire are not limited to copper wires having a rectangular cross-section, they may be copper wires having a circular cross-section. The strand of wire 30 is not limited to a copper wire, and it may be an aluminum wire.

Although according to the embodiments of the present invention, winding assemblies formed with continuous wires are used, the winding assemblies are not limited to those formed with continuous wires, and they may be formed with short conductors connected to each other, whereby the same effect can be obtained.

Although according to the embodiments, the stator core is manufactured by rolling a rectangular parallelepiped laminated-core in a cylinder and butt-welding the same at ends thereof, the stator core thus manufactured may be pressed into a cylindrical outer-core and be welded integrally with the outer-core.

Although a stator for an alternator is used in the embodiments described above, the present invention is applicable to an armature for a dynamo-electric machine, which is provided with the winding assemblies inserted in slots in the radial directions, in which the same effect, such as improvement in the insulation and the efficiency in wire insertion, can be obtained.

The following advantages are offered by the above-described method for manufacturing an armature for an electrical rotating device and the armature manufactured by the method, according to the present invention.

According to the present invention, the method, for manufacturing an armature for a dynamo-electric machine comprising an armature core provided with a plurality of slots extending in an axial direction and disposed alongside each other in a circumferential direction, an armature winding inserted in the slots so as to be mounted on the armature core, and an insulator mounted in each of the slots for insulating between the armature core and the armature winding, comprises the steps of forming a substantially U-shaped insulator having side portions connected with a bottom portion, the side portions being bent at a first bent part of each side portion so as to be apart from each other to form outwardly bent portions on the top sides of the side portions; forming a winding assembly composed of strands of wire formed in a predetermined wound state; mounting the insulator in each of the plurality of slots in a manner such that the outwardly bent portions of the insulator protrude from an open side of the slot; and inserting the winding assembly in the insulator from the open side of each slot by being guided by the outwardly bent portions of the insulator, and pushing the winding assembly together with the insulators into the slots. With this arrangement, in the method for manufacturing an armature for a dynamo-electric machine, the winding assembly can be inserted easily in virtue of the outwardly bent portions of the insulator bent so as to be apart from each other serving as guides. The winding assembly is inserted in each insulator mounted in the slot with the outwardly bent portions of the insulator protruding from the slot, and the insulator is pushed in the slot together with the winding assembly, whereby the winding assembly is prevented from damages to the strands of wire thereof to be caused by interference with flanges of teeth, thereby providing a method for manufacturing an armature for a dynamo-electric machine, in which superior insulation is ensured.

In the method, the step of forming the substantially U-shaped insulator includes the step of bending the outwardly bent portions at a second bent part so as to be close to each other, whereby each of the outwardly bent portions is formed in an L-shape. With this arrangement, when the winding assembly is received in the slots, the outwardly bent portions are deformed so as to enclose the open side of the slots. Consequently, the winding assembly is enclosed by the insulator, whereby the insulation is improved and the strands of wire are prevented from falling away.

The first and second bent parts of one of the side portions of the insulator are positioned shifted toward the bottom portion of the insulator with respect to the first and second bent parts of the other side portion of the insulator. When the winding assembly is inserted in each slot, one of the outwardly bent portions of the insulator is deformed prior to the other outwardly bent portion, whereby the top side of one outwardly bent portion is covered by the top side of the other outwardly bent portion so as to overlap one on the other, thereby surely enclosing slot openings, improving the insulation, and preventing the strands of wire from falling away.

At least one part of the bottom portion of the insulator is formed in one of concave and convex shapes. With this arrangement, the concave or convex bottom portion of the insulator is extended along the bottom of the slot in a circumferential direction, thereby coming into contact with the inner face of the bottom of the slot. Therefore, the movement of the insulator is restricted and the insulators do not fall away.

The insulators are mounted on a rectangular parallelepiped laminated-core provided with the plurality of slots. The rectangular parallelepiped laminated-core provided with the insulator mounted in each of the plurality of slots and the winding assembly inserted in the insulators mounted in the plurality of slots is rolled up and is butt-welded at ends thereof so as to form a cylinder. With this arrangement, the width of each slot formed in the rectangular laminated-core can be made greater than that of a slot formed in a cylindrical armature core, whereby the insulators and the winding assembly can be inserted easily.

The winding assembly is formed so that the strands of wire are disposed alongside each other in the slot-depth direction in each slot. With this arrangement, each insulator is pushed by the winding assembly only at the bottom of the insulator, and the side portions of the insulator is prevented from shifting each other in the slot depth direction, whereby the flanges of the teeth are prevented from being exposed, thereby avoiding damages to the insulating films of the strands of wire due to friction between the winding assembly and the flanges of the teeth.

The winding assembly comprises a pair of first and second winding groups, the first winding group comprising a number of first winding sub-portions each formed with the strand of wire made of a continuous conductor, the strand of wire being formed in a first wave shape by connecting straight portions which being disposed at a pitch of a predetermined number of slots and being alternately offset from each other by a predetermined distance in a direction perpendicular to the direction of the disposition thereof with turn portions, the first winding sub-portions being disposed at a pitch of one slot from each other and being equal in number to the predetermined number of slots, and the second winding group comprising a number of second winding sub-portions each formed with the strand of wire made of a continuous conductor, the strand of wire being formed in a second wave shape opposite to the first wave shape by connecting straight portions which being disposed at a pitch of the predetermined number of slots and being alternately offset from each other by the predetermined distance in a direction perpendicular to the direction of the disposition thereof with turn portions, the second winding sub-portions being disposed at a pitch of one slot from each other and being equal in number to the predetermined number of slots. With this arrangement, the turn of the armature winding can be easily increased by using a plurality of the winding assemblies overlapping each other to be inserted in the slots.

Since a plurality of the winding assemblies overlapping each other are inserted in the plurality of slots, insertion processes of the winding assemblies can be reduced.

The steps of mounting the insulator in each of the plurality of slots and inserting the winding assembly in the insulators mounted in the plurality of slots are be alternately and repeatedly performed. Therefore, the strands of wire to be inserted together with the insulators can be reduced, thereby facilitating the insertion of the winding assemblies and ensuring the insulation between the winding assemblies.

In the armature for a dynamo-electric machine comprising an armature core provided with a plurality of slots extending in an axial direction and disposed alongside each other in a circumferential direction, an armature winding inserted in the slots so as to be mounted on the armature core, and an insulator mounted in each of the slots for insulating between the armature core and the armature winding, the insulator is disposed between an inner face of each slot and the armature winding, and first creases are formed on side portions of each insulator so as to extend in a longitudinal direction of the slot at a slot-opening side of the side portions, the first creases being formed by first bent parts for bending the slot-opening side of the side portions so as to be apart from each other. With this arrangement, the insulator encloses the opening of each slot at the top sides of the insulator, thereby providing an armature for a dynamo-electric machine in which the insulation between the armature winding and the armature core is improved.

Second creases are formed on the side portions of each insulator so as to extend in a longitudinal direction of the slot at a slot-opening side of the first creases, the second creases being formed by second bent parts for bending the slot-opening side of the side portions so as to be close to each other. Therefore, the insulator encloses the opening of each slot at the top sides of the insulator, thereby improving the insulation between the armature winding and the armature core.

The first crease and the second crease of a first side portion of each insulator are formed shifted toward the bottom of the slot with respect to the first crease and the second crease, respectively, of a second side portion of each insulator, whereby the top sides of the first and second side portions of each insulator, one overlapping the other, enclose an opening of each slot in a manner such that the top side of the second side portion is positioned over the top side of the first side portion. The top sides of the first and second side portions of the insulator overlapping each other in the slot-depth direction enclose the opening of each slot, thereby further improving the insulation between the armature winding and the armature core.

The side portions of each insulator expand in a circumferential direction at the bottom sides of the side portions of the insulator, thereby coming into close contact with inner faces of the slot toward the bottom thereof. Therefore, the movement of the insulator in the slot is restricted and the insulation between the armature winding and the armature core can be ensured for a long period.

The armature winding is constituted by at least one winding assembly into which a pair of first and second winding groups is assembled before insertion in the slots, the first winding group comprising a number of first winding sub-portions each having one turn constructed by winding a stand of wire made of a continuous conductor so as to alternately occupy an inner layer and an outer layer in a slot depth direction within the slots at intervals of a predetermined number of slots, the first winding sub-portions being disposed at a pitch of one slot from each other and being equal in number of the predetermined number of slots, and the second winding group comprising a number of second winding sub-portions each having one turn constructed by winding a stand of wire made of a continuous conductor so as to alternately occupy an inner layer and an outer layer in a slot depth direction within the slots at intervals of the predetermined number of slots and so as to be inversely wound and offset by an electrical angle of 180 degrees relative to the first winding sub-portions, the second winding sub-portions being disposed at a pitch of one slot from each other and being equal in number of the predetermined number of slots. With this arrangement, an armature is provided, of which coil-end groups have a reduced irregularity in flatness of inner surfaces thereof in the circumferential direction and a reduced protrusion thereof in the axial direction.

The armature winding comprises a plurality of the winding assemblies, and one insulator is received in each slot for insulating the plurality of the winding assemblies from an inner face of each slot, thereby ensuring the insulation between the armature winding and the armature core.

The armature winding comprises a plurality of the winding assemblies, and a plurality of insulators are received in each slot for individually insulating the plurality of the winding assemblies from an inner face of each slot, thereby ensuring the insulation between the armature winding and the armature core.

The foregoing description of the preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments ware chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An armature for a dynamo-electric machine, the armature comprising:
   an armature core provided with a plurality of slots extending in an axial direction and disposed alongside each other in a circumferential direction;
   an armature winding inserted in the slots so as to be mounted on the armature core; and
   an insulator mounted in each of the slots for insulating between the armature core and the armature winding,
   wherein the insulator is disposed between an inner face of each slot and the armature winding, and first creases are formed on side portions of each insulator so as to extend in a lengthwise direction of the slot at a slot-opening end of the side portions, the first creases being preformed prior to the insulator being mounted in said slots by first bent parts for angling the slot-opening ends of the side portions so as to be apart from each other.

2. The armature for a dynamo-electric machine according to claim 1, wherein second creases are formed on the side portions of each insulator so as to extend in a lengthwise direction of the slot at a location closer to the slot-opening end than the first creases, the second creases being formed by second bent parts for angling the slot-opening ends of the side portions toward each other.

3. The armature for a dynamo-electric machine according to claim 2, wherein the first crease and the second crease of a first side portion of each insulator are formed shifted toward the bottom of the slot with respect to the first crease and the second crease, respectively, of a second side portion of each insulator, whereby the top ends of the first and second side portions of each insulator, one overlapping the other, enclose an opening of each slot in a manner such that the top end of the second side portion is positioned over the top end of the first side portion.

4. A The armature for a dynamo-electric machine according to claim 1, wherein the side portion of each insulator expand in a circumferential direction at the bottom ends of the side portions of the insulator, thereby coming into close contact with inner faces of the slot toward the bottom thereof.

5. The armature for a dynamo-electric machine according to claim 1, wherein the armature winding is constituted by at least one winding assembly into which a pair of first and second winding groups is assembled before insertion in the slots, the first winding group comprising a number of first winding sub-portions each having one turn constructed by winding a strand of wire made of a continuous conductor so as to alternately occupy an inner layer and an outer layer in a slot depth direction within the slots at intervals of a predetermined number of slots, tbe first winding sub-portions being disposed at a pitch of one slot from each other and being equal in number to the predetermined number of slots, and the second winding group comprising a number of second winding sub-portions each having one turn constructed by winding a strand of wire made of a continuous conductor so as to alternately occupy an inner layer and an outer layer in a slot depth direction within the slots at intervals of the predetermined number of slots and so as to be inversely wound and offset by an electrical angle of 180 degrees relative to the first winding sub-portions, the second winding sub-portions being disposed at a pitch of one slot from each other and being equal in number of the predetermined number of slots.

6. The armature for a dynamo-electric machine according to claim 5, wherein the armature winding comprises a plurality of the winding assemblies, and one insulator is received in each slot for insulating the plurality of the winding assemblies from an inner face of each slot.

7. The armature for a dynamo-electric machine according to claim 5, wherein the armature winding comprises a plurality of the winding assemblies, and a plurality of insulators are received in each slot for individually insulating the plurality of the winding assemblies from an inner face of each slot.

* * * * *